United States Patent
Takeda

(10) Patent No.: US 10,684,133 B2
(45) Date of Patent: Jun. 16, 2020

(54) ROUTE GENERATOR, ROUTE GENERATION METHOD, AND ROUTE GENERATION PROGRAM

(71) Applicant: HONDA MOTOR CO., LTD., Minato-ku, Tokyo (JP)

(72) Inventor: Masanori Takeda, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 295 days.

(21) Appl. No.: 15/745,454

(22) PCT Filed: Jun. 28, 2016

(86) PCT No.: PCT/JP2016/069166
§ 371 (c)(1),
(2) Date: Jan. 17, 2018

(87) PCT Pub. No.: WO2017/014012
PCT Pub. Date: Jan. 26, 2017

(65) Prior Publication Data
US 2018/0238696 A1    Aug. 23, 2018

(30) Foreign Application Priority Data

Jul. 22, 2015   (JP) ................................ 2015-144994
Mar. 15, 2016  (JP) ................................ 2016-051076

(51) Int. Cl.
*G01C 21/34* (2006.01)
*B60W 30/08* (2012.01)
(Continued)

(52) U.S. Cl.
CPC ......... *G01C 21/3446* (2013.01); *B60W 30/08* (2013.01); *B60W 30/095* (2013.01);
(Continued)

(58) Field of Classification Search
CPC ....... B60W 2050/065; B60W 2050/10; B60W 2550/146; B60W 2550/30;
(Continued)

(56) References Cited

U.S. PATENT DOCUMENTS 8,903,880 B2 * 12/2014 Takeda .................... G06F 7/38
708/443
10,429,849 B2 * 10/2019 Zhang ................. G05D 1/0217
(Continued)

FOREIGN PATENT DOCUMENTS

JP    2002-213980    7/2002
JP    2002-228467    8/2002
(Continued)

OTHER PUBLICATIONS

International Search Report for International Patent Application No. PCT/JP2016/069166 dated Aug. 23, 2016, 4 pages.

*Primary Examiner* — Donald J Wallace
(74) *Attorney, Agent, or Firm* — Amin, Turocy & Watson, LLP

(57) ABSTRACT

A route generator includes: a conversion unit configured to generate virtual road information in which a shape of a road has been converted into a rectilinear shape on the basis of map information including information indicating the shape of the road; a traveling path generating unit configured to generate a traveling path of a host vehicle on the road having the rectilinear shape in the virtual road information generated by the conversion unit; and an inverse conversion unit configured to generate a traveling path of the host vehicle in the shape of the road which has not been converted into the rectilinear shape by the conversion unit by performing inverse conversion of the conversion performed by the conversion unit on the traveling path of the host vehicle
(Continued)

generated on the road having the rectilinear shape by the traveling path generating unit.

10 Claims, 15 Drawing Sheets

(51) Int. Cl.
*B60W 30/095* (2012.01)
*G01C 21/30* (2006.01)
*G01C 21/36* (2006.01)
*G08G 1/16* (2006.01)
*B60W 30/12* (2020.01)
*B60W 50/06* (2006.01)
*B60W 30/14* (2006.01)
*G01C 21/12* (2006.01)
*G05D 1/00* (2006.01)

(52) U.S. Cl.
CPC ......... *G01C 21/30* (2013.01); *G01C 21/3415* (2013.01); *G01C 21/3602* (2013.01); *G01C 21/3676* (2013.01); *G01C 21/3694* (2013.01); *G08G 1/16* (2013.01); *B60W 30/12* (2013.01); *B60W 30/14* (2013.01); *B60W 2050/065* (2013.01); *B60W 2552/30* (2020.02); *B60W 2554/00* (2020.02); *B60W 2554/80* (2020.02); *B60W 2556/50* (2020.02); *G01C 21/12* (2013.01); *G01C 21/3629* (2013.01); *G01C 21/3658* (2013.01); *G05D 1/0088* (2013.01); *G05D 2201/0213* (2013.01); *G08G 1/167* (2013.01)

(58) Field of Classification Search
CPC ........... B60W 2550/402; B60W 30/08; B60W 30/095; B60W 30/12; B60W 30/14; G01C 21/12; G01C 21/26; G01C 21/30; G01C 21/3415; G01C 21/3446; G01C 21/3602; G01C 21/3676; G01C 21/3694; G05D 1/0088; G05D 2201/0213; G08G 1/16; G08G 1/167
See application file for complete search history.

(56) References Cited

U.S. PATENT DOCUMENTS

| | | | |
|---|---|---|---|
| 2006/0184317 A1* | 8/2006 | Asahara | G01C 21/3453 701/532 |
| 2013/0006473 A1 | 1/2013 | Buerkle et al. | |
| 2016/0178381 A1* | 6/2016 | Lynch | G01C 21/30 701/23 |
| 2017/0287142 A1* | 10/2017 | Xie | A63F 13/215 |
| 2018/0024564 A1* | 1/2018 | Matsuda | B62D 15/0265 701/25 |

FOREIGN PATENT DOCUMENTS

| | | |
|---|---|---|
| JP | 2005-182186 | 7/2005 |
| JP | 2012-066778 | 4/2012 |
| JP | 2013-513149 | 4/2013 |
| JP | 5446136 B2 * | 3/2014 |

* cited by examiner

| LINK ID | ANGLE | LENGTH |
|---|---|---|
| L[0] | ... | ... |
| L[1] | ... | ... |
| ... | ... | ... |
| L[k-1] | ... | ... |
| L[k] | ... | ... |
| L[k+1] | ... | ... |
| ... | ... | ... |
| L[n] | ... | ... |

ROUTE GENERATOR, ROUTE GENERATION METHOD, AND ROUTE GENERATION PROGRAM

TECHNICAL FIELD

The present invention relates to a route generator, a route generation method, and a route generation program.

Priority is claimed on Japanese Patent Application No. 2015-144994, filed Jul. 22, 2015, and Japanese Patent Application No. 2016-051076, filed Mar. 15, 2016, the content of which is incorporated herein by reference.

BACKGROUND ART

Conventionally, a technique of controlling traveling of a vehicle along a predetermined traveling path on a road such as a curved road is known. In this regard, as a traveling path setting device for a vehicle that detects line markings indicating a lane ahead of a vehicle by imaging means and setting a traveling path of the vehicle on the basis of the line markings, a traveling path setting device for a vehicle including position detection means that detects a position of an inner line marking in front of the vehicle, tangent angle calculating means that calculates a tangent angle which is formed by a traveling direction of the vehicle and a tangent line on the inner line marking at a position of the inner line marking detected by the position detecting means, correction value calculating means that calculates a correction value on the basis of the tangent angle calculated by the tangent angle calculating means, and traveling path position setting means that sets a traveling path position to a position inward from the center of right and left line markings in front of the vehicle by the correction value calculated by the correction value calculating means is known (for example, see Patent Literature 1).

With regard to the above-mentioned technique, a traveling path preparing device that prepares a traveling path of a vehicle and includes curved road shape recognizing means that recognizes a shape of a curved road from an entrance to an exit, exit prediction point specifying means that specifies a point predicted to be an exit in the curved road, and traveling path preparing means that prepares a traveling path of the vehicle from the entrance to the exit prediction point and from the exit prediction point to the exit is also known (for example, see Patent Literature 2).

CITATION LIST

Patent Literature

[Patent Literature 1]
Japanese Unexamined Patent Application, First Publication No. 2005-182186
[Patent Literature 2]
Japanese Unexamined Patent Application, First Publication No. 2012-066778

SUMMARY OF INVENTION

Technical Problem

However, in the conventional art, when a traveling path for a curved road is calculated, various arithmetic operation parameters may cover wide ranges and an arithmetic operation load may increase excessively.

An aspect of the invention is made in consideration of the above-mentioned circumstances and an object thereof is to provide a route generator, a route generation method, and a route generation program that can generate a traveling path suitable for a shape of a road with a small arithmetic operation load.

Solution to Problem (1) A route generator according to an aspect of the invention includes: a conversion unit configured to generate virtual road information in which a shape of a road has been converted into a rectilinear shape on the basis of map information including information indicating the shape of the road; a traveling path generating unit configured to generate a traveling path of a host vehicle on the road having the rectilinear shape in the virtual road information generated by the conversion unit; and an inverse conversion unit configured to generate a traveling path of the host vehicle in the shape of the road which has not been converted into the rectilinear shape by the conversion unit by performing inverse conversion of the conversion performed by the conversion unit on the traveling path of the host vehicle generated on the road having the rectilinear shape by the traveling path generating unit.

(2) In the aspect according to (1), the inverse conversion unit performs the inverse conversion such that a distance between a divided line closest to a reference point set on the basis of the map information among divided lines into which a rectilinear line representing a road included in the virtual road information is divided and the reference point is maintained before and after the inverse conversion.

(3) In the aspect according to (1) or (2), the traveling path generating unit generates the traveling path by performing geometric curve interpolation on the road having the rectilinear shape in the virtual road information generated by the conversion unit.

(4) In the aspect according to (3), the traveling path generating unit generates the traveling path by applying a spline curve based on at least a velocity vector of the host vehicle.

(5) In the aspect according to any one of (1) to (3), the route generator further includes a recognition unit configured to recognize an obstacle which hinders traveling of the host vehicle on the road, and the traveling path generating unit generates a plurality of obstacle-avoiding traveling paths for avoiding the obstacle recognized by the recognition unit.

(6) In the aspect according to (5), the route generator further includes a path evaluating unit configured to select one obstacle-avoiding traveling path in which the host vehicle does not interfere with the obstacle on the basis of a curvature of the shape of the road which has not been converted by the conversion unit and curvatures of the plurality of obstacle-avoiding traveling paths among the plurality of obstacle-avoiding traveling paths generated on the road having the rectilinear shape by the traveling path generating unit when the obstacle has been recognized by the recognition unit, and the inverse conversion unit generates the obstacle-avoiding traveling path of the host vehicle in the shape of the road which has not been converted into the rectilinear shape by the conversion unit by performing inverse conversion of the conversion performed by the conversion unit on the one obstacle-avoiding traveling path selected by the path evaluating unit.

(7) In the aspect according to claim 6), the path evaluating unit sets an area based on the shape of the obstacle on the basis of a distance from the divided line from which a distance to the reference point is to be maintained to the obstacle recognized by the recognition unit, and selects one obstacle-avoiding traveling path in which the host vehicle does not interfere with the set area among the plurality of obstacle-avoiding traveling paths generated on the road having the rectilinear shape by the traveling path generating unit when the obstacle has been recognized by the recognition unit.

(8) In the aspect according to any one of (1) to (7), the inverse conversion unit corrects the traveling path forming a loop-shaped portion to a path other than the loop-shaped portion when the generated traveling path forms the loop-shaped portion by intersecting itself.

(9) A route generation method according to another aspect of the invention includes: generating virtual road information in which a shape of a road has been converted into a rectilinear shape on the basis of map information including information indicating the shape of the road; generating a traveling path of a host vehicle on the road having the rectilinear shape in the generated virtual road information; and generating a traveling path of the host vehicle in the shape of the road which has not been converted into the rectilinear shape by performing inverse conversion of the conversion of converting the shape of the road to the rectilinear shape on the traveling path of the host vehicle generated on the road having the rectilinear shape.

(10) A route generation program according to another aspect of the invention causes an on-board computer to perform: generating virtual road information in which a shape of a road has been converted into a rectilinear shape on the basis of map information including information indicating the shape of the road; generating a traveling path of a host vehicle on the road having the rectilinear shape in the generated virtual road information; and generating a traveling path of the host vehicle in the shape of the road which has not been converted into the rectilinear shape by performing inverse conversion of the conversion of converting the shape of the road to the rectilinear shape on the traveling path of the host vehicle generated on the road having the rectilinear shape.

Advantageous Effects of Invention

According to the aspects of (1), (2), (9), and (10), since the conversion unit configured to generate virtual road information in which a shape of a road has been converted into a rectilinear shape on the basis of map information including information indicating the shape of the road, the traveling path generating unit configured to generate a traveling path of a host vehicle on a road having a rectilinear shape which is expressed by the virtual road information generated by the conversion unit, and the inverse conversion unit configured to generate a traveling path of the host vehicle in the shape of the road which has not been converted into the rectilinear shape by the conversion unit by performing inverse conversion of the conversion performed by the conversion unit on the traveling path of the host vehicle generated on the road having the rectilinear shape by the traveling path generating unit are provided, it is possible to generate a traveling path suitable for a shape of a road with a small arithmetic operation load.

According to (3) or (4), since the traveling path generating unit generates the traveling path by performing geometric curve interpolation on the road which is included in the virtual road information generated by the conversion unit, it is possible to generate a traveling path more suitable for an actual shape of a road.

According to (5) or (6), since the path evaluating unit selects one obstacle-avoiding traveling path on the basis of a curvature of the shape of the road which has not been converted by the conversion unit and curvatures of the traveling paths generated on the road having the rectilinear shape by the traveling path generating unit, it is possible to generate a traveling path that can reduce a burden on a vehicle occupant.

According to (7), since the path evaluating unit sets an area based on the shape of the obstacle to be considered between the obstacle and the host vehicle on the basis of the distance from the divided line from which a distance to the reference point is to be maintained to the obstacle among the plurality of obstacle-avoiding traveling paths generated by the traveling path generating unit and selects one obstacle-avoiding traveling path, it is possible to generate a traveling path suitable for avoidance of an obstacle.

According to (8), since the inverse conversion unit corrects the generated traveling path to a path which does not form a loop-shaped portion on the basis of a point which is intersected by the traveling path when the generated traveling path intersects itself to form the loop-shaped portion, it is possible to generate a traveling path with higher accuracy.

DESCRIPTION OF EMBODIMENTS

Hereinafter, a route generator, a route generation method, and a route generation program according to embodiments of the invention will be described with reference to the accompanying drawings.

First Embodiment

Figure 1:
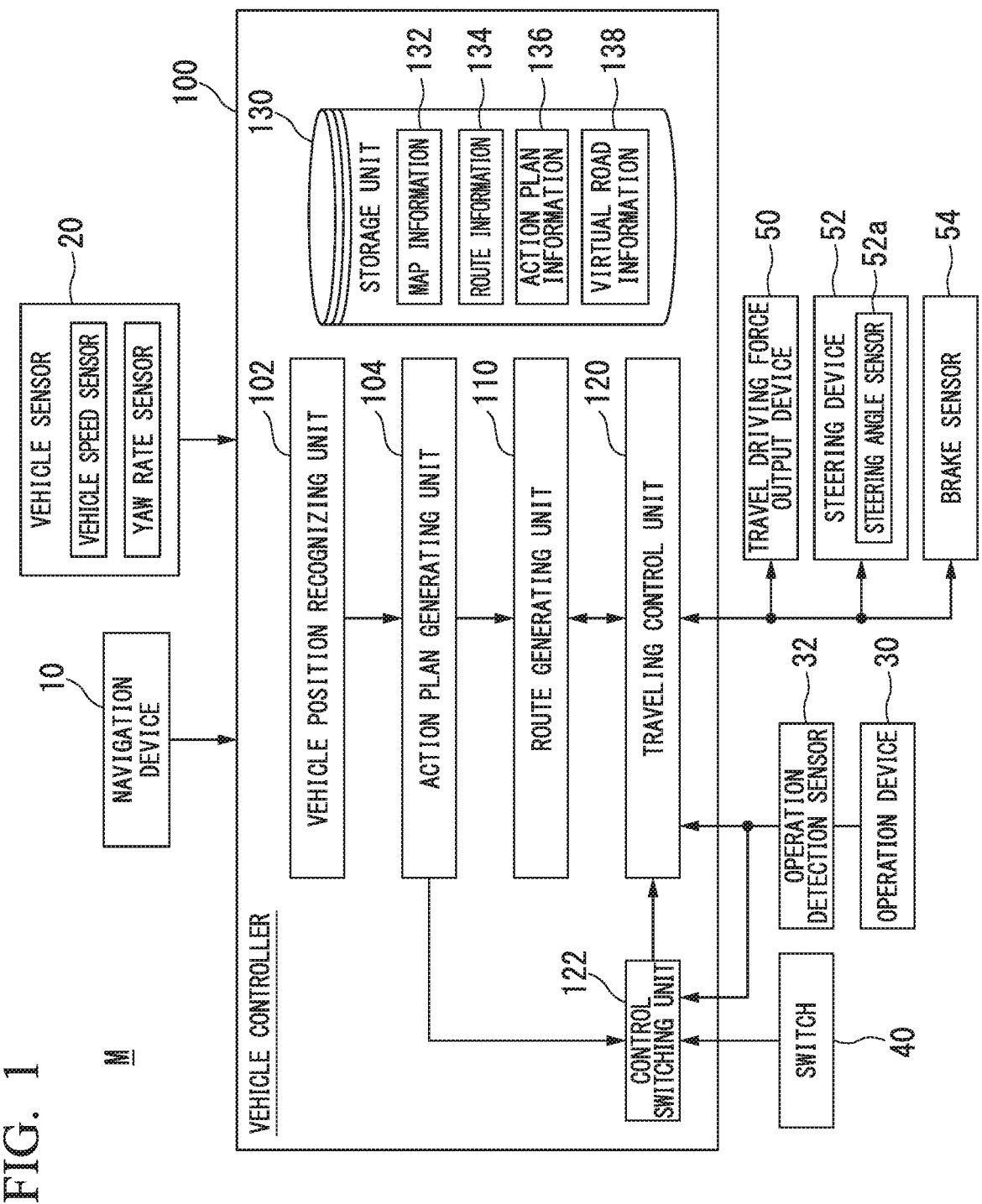
FIG. 1 is a diagram illustrating a functional configuration of a host vehicle centered on a vehicle controller according to a first embodiment.

FIG. 1 is a diagram illustrating a functional configuration of a host vehicle M centered on a vehicle controller 100 according to a first embodiment. The host vehicle M is a vehicle in which the vehicle controller 100 is mounted. In addition to the vehicle controller 100, a navigation device 10, a vehicle sensor 20, an operation device 30, an operation detection sensor 32, a switch 40, a travel driving force output device 50, a steering device 52, and a brake device 54 are mounted in the host vehicle M.

The navigation device 10 includes a Global Navigation Satellite System (GNSS) receiver, map information (a navigation map), a touch panel type display device serving as a user interface, a speaker, and a microphone. The navigation device 10 specifies a position of the host vehicle M using the GNSS receiver and derives a route from the specified position to a destination designated by a user. The route derived by the navigation device 10 is defined by a combination of links and nodes included in the map information 132. A node is information indicating a nodal point in expressing a road network, such as an intersection. A link is information indicating a road section between nodes.

The route derived by the navigation device 10 is stored as route information 134 in a storage unit 130. The position of the host device may be specified or compensated for by an inertial navigation system (INS) using an output of the vehicle sensor 20. The navigation device 10 performs guidance of a route to a destination using voice or navigation display when the vehicle controller 100 performs a manual driving mode. The configuration for specifying the position of the host vehicle M may be provided independently from the navigation device 10. The navigation device 10 may be embodied, for example, by one function of a terminal device such as a smartphone or a tablet terminal which is carried by a user. In this case, transmission and reception of information between the terminal device and the vehicle controller 100 is performed in a wireless or wired manner.

The vehicle sensor 20 includes a vehicle speed sensor 22 that detects a speed of the host vehicle M (a vehicle speed) and a yaw rate sensor 24 that detects an angular velocity about a vertical axis. The vehicle sensor 20 may include an acceleration sensor that detects acceleration and a direction sensor that detects a direction of the host vehicle M.

The operation device 30 includes, for example, an accelerator pedal, a steering wheel, a brake pedal, and a shift lever. An operation detection sensor 32 that detects whether an operation is performed by a driver or what the operation is performed is attached to the operation device 30. The operation detection sensor 32 includes, for example, a throttle valve opening degree sensor, a steering torque sensor, a brake sensor, and a shift position sensor. The operation detection sensor 32 outputs a throttle valve opening degree, a steering torque, a brake pedal depression amount, and a shift position as detection results to a traveling control unit 120. Instead, the detection result of the operation detection sensor 32 may be output directly to a travel driving force output device 50, a steering device 52, or a brake device 54.

The switch 40 is a switch which is operated by a driver or the like. The switch 40 may be a mechanical switch or a graphical user interface (GUI) switch which is provided in a touch panel type display device of the navigation device 10. The switch 40 receives a switching instruction between a manual driving mode in which a driver manually drives the vehicle and an automatic driving mode in which the vehicle travels in a state in which a driver perform no operation (or in which an amount of operation is less or an operation frequency is lower than that in the manual driving mode), and generates a control mode designation signal for designating a control mode of the traveling control unit 120 to one of the automatic driving mode and the manual driving mode.

The travel driving force output device 50 includes, for example, one or both of an engine and a traveling motor. When the travel driving force output device 50 includes only the engine, the travel driving force output device 50 additionally includes an engine electronic control unit (engine ECU) that controls the engine. The engine ECU controls a travel driving force (a torque) for causing the vehicle to travel by adjusting a throttle valve opening degree, a shift stage, or the like, for example, on the basis of information input from the traveling control unit 120. When the travel driving force output device 50 includes only the traveling motor, the travel driving force output device 50 additionally includes a motor ECU that drives the traveling motor. The motor ECU controls the travel driving force for causing the vehicle to travel, for example, by adjusting a duty ratio of a PWM signal supplied to the traveling motor. When the travel driving force output device 50 includes both the engine and the traveling motor, the engine ECU and the motor ECU control the travel driving force in cooperation with each other.

The steering device 52 includes, for example, an electric motor that can change directions of turning wheels by applying a force to a rack-and-pinion function or the like. The steering device 52 includes a steering angle sensor 52a that detects a steering angle (or an actually steered angle).

The steering device 52 drives the electric motor on the basis of information input from the traveling control unit 120.

The brake device 54 includes a master cylinder to which a braking operation performed on the brake pedal is transmitted as a hydraulic pressure, a reservoir tank that stores a brake fluid, and a brake actuator that adjusts braking forces output to the wheels. The brake device 54 controls the brake actuator and the like such that brake torques with desired magnitudes are output to the wheels on the basis of the information input from the traveling control unit 120. The brake device 54 is not limited to an electronically controlled brake device which operates with the above-mentioned hydraulic pressure but may be an electronically controlled brake device which operates by an electric actuator.

[Vehicle Controller]

The vehicle controller 100 will be described below. The vehicle controller 100 includes, for example, a vehicle position recognizing unit 102, an action plan generating unit 104, a route generating unit 110, a traveling control unit 120, a control switching unit 122, and a storage unit 130. Some or all of the vehicle position recognizing unit 102, the action plan generating unit 104, the route generating unit 110, the traveling control unit 120, and the control switching unit 122 are software functional units that function by causing a processor such as a central processing unit (CPU) to execute a program. Some or all of the functional units may be hardware functional units such as a large scale integration (LSI) or an application specific integrated circuit (ASIC). The storage unit 130 is embodied by a read only memory (ROM), a random access memory (RAM), a hard disk drive (HDD), or a flash memory. The program which is executed by the processor may be stored in the storage unit 130 in advance or may be downloaded from an external device via on-board Internet equivalent or the like. The program may be installed in the storage unit 130 by causing a portable storage medium having the program stored thereon to be attached to a drive device which is not illustrated.

The vehicle position recognizing unit 102 recognizes a lane (a host lane) in which the host vehicle M travels and a relative position of the host vehicle M to the traveling lane on the basis of the map information 132 stored in the storage unit 130 and information input from the navigation device 10 or the vehicle sensor 20. The map information 132 is, for example, map information which is more precise than a navigation map stored in the navigation device 10 and includes, for example, information of a center of a lane or information of a boundary of a lane. More specifically, the map information 132 includes road information, traffic regulation information, address information (addresses and post numbers), facility information, phone number information, and the like. The road information includes information indicating a type of a road such as an expressway, a toll road, a national road, and a prefectural road or information such as the number of lanes of a road, a width of each lane, a gradient of a road, a position of a road (three-dimensional coordinates including longitude, latitude, and height), curvatures of curves of a lane, positions of merging and branch points of a lane, and signs disposed on a road. The traffic regulation information includes information indicating that a lane is blocked due to constructions, traffic accidents, congestion, and the like.

For example, the vehicle position recognizing unit 102 recognizes a separation of a reference point of the host vehicle (for example, a tip of the vehicle) from the center of the traveling lane and an angle θ formed by the traveling direction of the host vehicle and a line connecting the center of the traveling lane as a relative position of the host vehicle to the traveling lane. Instead, the vehicle position recognizing unit 102 may recognize a position of the reference point of the host vehicle relative to one edge of the traveling lane and the like as a relative position of the host vehicle to the traveling lane.

The vehicle position recognizing unit 102 may recognize a lane using a finder, a radar, or a camera.

The action plan generating unit 104 generates an action plan in a predetermined section. The predetermined section is, for example, a section in which a route derived by the navigation device 10 passes through a toll road such as an expressway. The invention is not limited thereto, but the action plan generating unit 104 may generate an action plan for an arbitrary section.

An action plan includes, for example, a plurality of events which are sequentially carried out. Examples of the events include a deceleration event in which the host vehicle M decelerates, an acceleration event in which the host vehicle M accelerates, a lane keep event in which the host vehicle M travels such that the vehicle does not depart from the traveling lane, and a lane change event in which the traveling lane changes. For example, when an intersection (a junction) is present in a toll road (for example, an expressway), the vehicle controller 100 needs to change a lane or maintain the lane such that the host vehicle M travel toward a destination in the automatic driving mode. Accordingly, the action plan generating unit 104 sets a lane change event or a lane keep event.

[Generation of Route]

The route generating unit 110 generates a traveling route in which the host vehicle M should travel on the basis of various events included in the action plan generated by the action plan generating unit 104. The route generating unit 110 generates a more detailed route than a route which is specified by nodes and links derived by the navigation device 10. The route generating unit 110 generates a traveling route, for example, when the action plan is a lane keep event and a shape of a road is curved such as a curved road. The route generating unit 110 corresponds to a "route generator."

Figure 2:
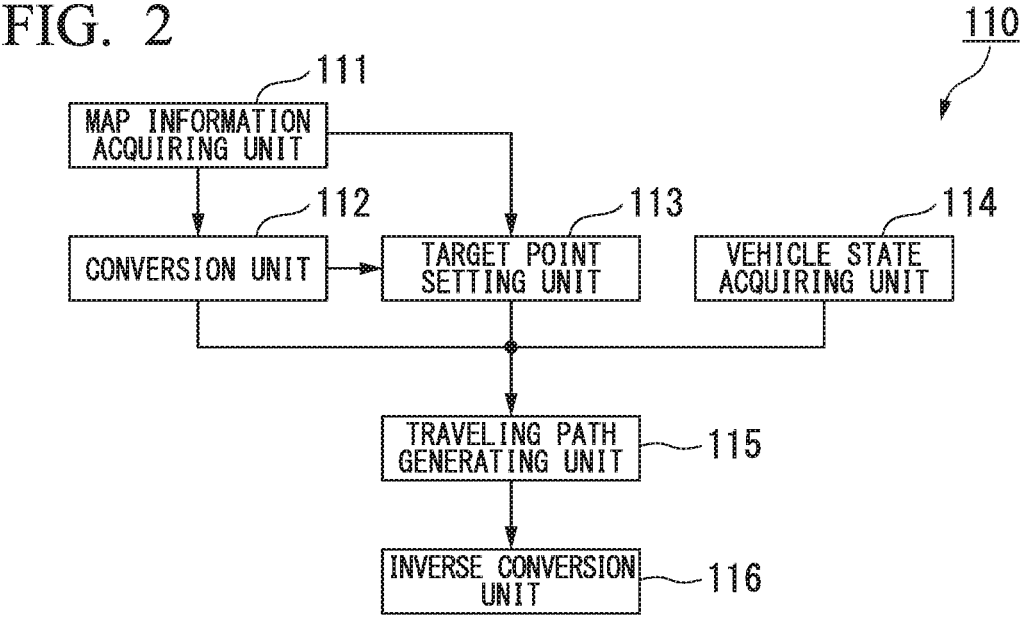
FIG. 2 is a block diagram illustrating a functional configuration of a route generating unit according to the first embodiment.

FIG. 2 is a block diagram illustrating a functional configuration of the route generating unit 110 according to the first embodiment. The route generating unit 110 includes a map information acquiring unit 111, a conversion unit 112, a target point setting unit 113, a vehicle state acquiring unit 114, a traveling path generating unit 115, and an inverse conversion unit 116.

The map information acquiring unit 111 acquires the map information 132 stored in the storage unit 130 on the basis of the position of the host vehicle which is calculated by the navigation device 10. The map information acquiring unit 111 outputs the map information 132 including a road around the position of the host vehicle to the conversion unit 112.

The conversion unit 112 generates information in which a shape of a road in which the host vehicle travels has been virtually converted into a rectilinear shape on the basis of the map information 132 output from the map information acquiring unit 111. Here, it is assumed that a rectilinear line includes a curve of which a curvature is equal to or less than a threshold value. For example, the conversion unit 112 extracts information indicating a shape of a road included in the route indicated by the rout information 134 from the map information 132 output from the map information acquiring unit 111, and generates information in which the shape of the road in the information indicating the shape of the road has been virtually converted into a rectilinear shape. Hereinafter, the information in which a shape of a road has been converted into a rectilinear shape by the conversion unit 112 is referred to as "virtual road information 138."

The target point setting unit 113 sets a target point indicating an end point of a traveling path in which the host vehicle travels in the road which has been converted into a rectilinear shape by the conversion unit 112. For example, the target point setting unit 113 sets a target point to a position on the converted road corresponding to a coordinate point at which a differential value of a curvature change of a curved road with respect to the length direction of the road is minimized in an actual road with reference to the vehicle position recognized by the vehicle position recognizing unit 102. Specifically, the target point setting unit 113 sets a target point to a position on the converted road corresponding to the position (coordinates) at which the actual road is changed from a curve to a rectilinear line.

The target point setting unit 113 may set a target point indicating an end point of a traveling path in which the host vehicle travels in a road which has not been converted into a rectilinear shape by the conversion unit 112. For example, when a target road is a curved road, the target point setting unit 113 sets a target point on the curved road. Accordingly, the conversion unit 112 generates the virtual road information 138 in which a shape of the road (the curved road) on which the target point has been set by the target point setting unit 113 has been converted into a rectilinear shape.

The vehicle state acquiring unit 114 acquires a vehicle speed signal detected by the vehicle speed sensor 22, a yaw rate angle signal detected by the yaw rate sensor 24, and a steering angle signal detected by the steering angle sensor 52*a*. In this embodiment, the vehicle state acquiring unit 114 detects the vehicle speed, the yaw rate angle, and the steering angle, but the vehicle state acquiring unit 114 has only to acquire at least the vehicle speed. The vehicle state acquiring unit 114 acquires the yaw rate angle and the steering angle as signals of a rotary component in behavior of the host vehicle, but has only to acquire one of the yaw rate angel and the steering angle and may acquire another signal as long as it is a signal indicating a rotary component of the host vehicle.

The traveling path generating unit 115 generates a traveling path along the road which has been converted into a rectilinear shape by the conversion unit 112 on the basis of the position (the start point) of the host vehicle M, the target point (the end point) output from the target point setting unit 113, and the vehicle speed, the yaw rate angle, and the steering angle output from the vehicle state acquiring unit 114. The traveling path generating unit 115 performs arithmetic operation based on a predetermined curve function under the above-mentioned conditions. The predetermined curve function is a function of, when at least the start point, the end point, and the vehicle speed are set as parameters, calculating a function into which the parameters are substituted and generating curves for interpolation from the start point to the end point. In this embodiment, the predetermined curve function is, for example, a spline function that generates a spline curve. The traveling path generating unit 115 outputs a curve (including a rectilinear line) indicating the generated traveling path to the inverse conversion unit 116.

The inverse conversion unit 116 generates a traveling path of the host vehicle M in the shape of the road which has not been converted into the rectilinear shape by the conversion unit 112 by performing inverse conversion of the conversion performed by the conversion unit 112 on the traveling path generated on the road having a rectilinear shape by the traveling path generating unit 115. The inverse conversion unit 116 outputs information indicating the generated traveling path to the traveling control unit 120. The traveling control unit 120 controls the host vehicle such that the host vehicle travels along the traveling path generated by the inverse conversion unit 116.

Figure 3:
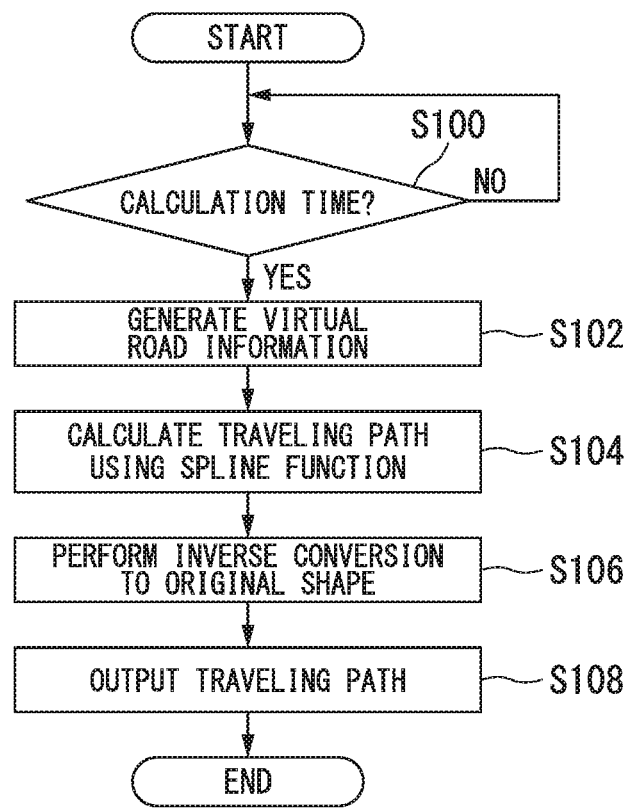
FIG. 3 is a flowchart illustrating an example of a process flow which is performed by the route generating unit according to the first embodiment.

A process which is performed by the route generating unit 110 will be described below with reference to a flowchart. FIG. 3 is a flowchart illustrating an example of a process flow which is performed by the route generating unit 110 according to the first embodiment. The process flow in the flowchart is performed, for example, before automatic driving is started, that is, before control based on the action plan is performed.

First, the route generating unit 110 determines whether a start time of a predetermined arithmetic operation period T has arrived (Step S100). The predetermined arithmetic operation period T is synchronized with an arithmetic operation period in which the vehicle controller 100 controls traveling of the host vehicle. The route generating unit 110 waits when it is determined that the start time of the predetermined arithmetic operation period T has not arrived and moves the process flow to Step S102 when it is determined that the start time of the predetermined arithmetic operation period T has arrived.

Then, the conversion unit 112 generates the virtual road information 138 in which a shape of a road in which the host vehicle M travels has been virtually converted into a rectilinear shape on the basis of the map information 132 output from the map information acquiring unit 111 (Step S102).

Figure 4:
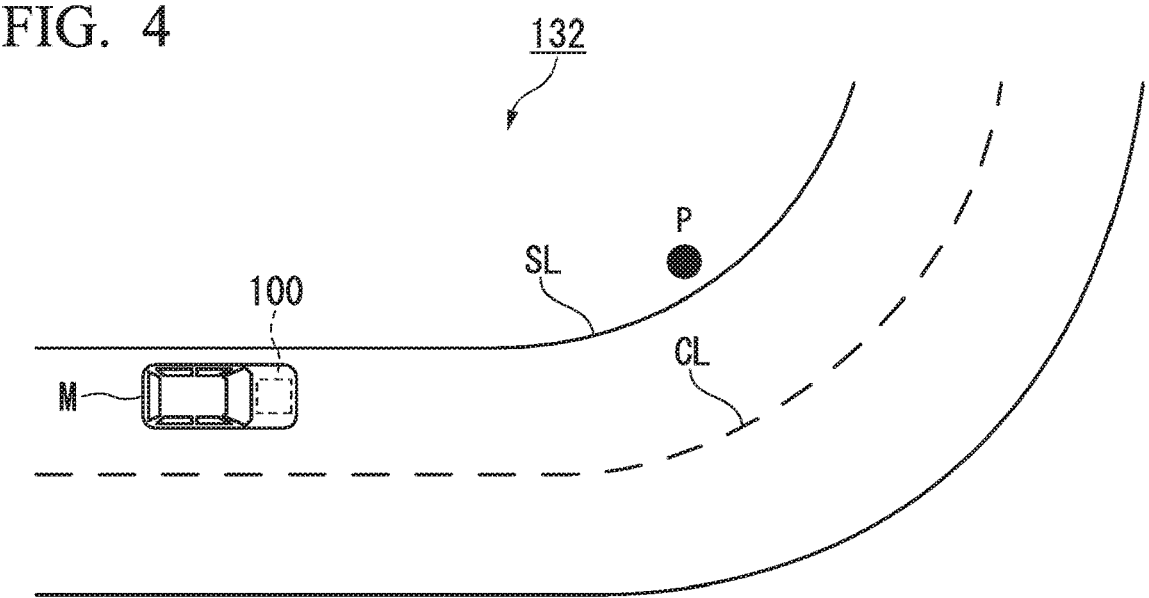
FIG. 4 is a diagram schematically illustrating a shape of a road indicated by map information.

FIG. 4 is a diagram schematically illustrating a shape of a road indicated by the map information 132. In the example illustrated in FIG. 4, the road is expressed as a curved road. As illustrated in FIG. 4, the conversion unit 112 marks a reference point P of which a position (coordinates) is known on a road to be converted or in the vicinity of the road before converting the shape of the road into a rectilinear shape. The reference point P is, for example, an object with which the host vehicle M should not come in contact.

In the example illustrated in FIG. 4, the reference point P is provided in the vicinity of a road side line SL. The reference point P may be set on the road or outside the road. The reference point P may be set on a line marking such as a road centerline CL or a road side line SL. A plurality of reference points P may be set at constant intervals outside the road (outside the road side line SL). In this embodiment, the road center line CL is, for example, a line marking for defining a lane in a road including two lanes on each side.

Figure 5:
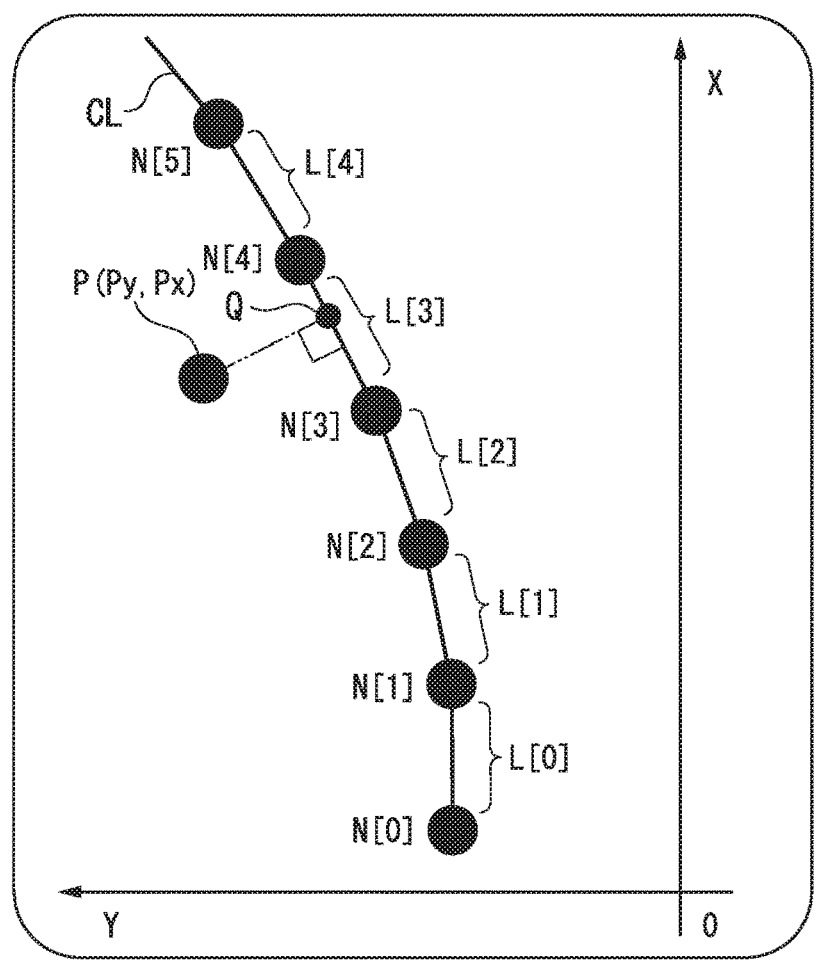
FIG. 5 is a diagram illustrating positions of a reference point and a road centerline on a road of which a shape has not been converted into a rectilinear shape by a conversion unit in two-dimensional coordinates.

A method of conversion a road shape which is performed by the conversion unit 112 will be described below. FIG. 5 is a diagram illustrating positions of the reference point P and the road centerline CL in a road of which the shape has not been converted into a rectilinear shape by the conversion unit 112 in two-dimensional coordinates. The road centerline CL is defined by a combination of links L[n] and nodes N[n]. The road centerline CL may be defined in the map information 132 in advance or may be defined by the conversion unit 112.

In the example illustrated in FIG. 5, the road centerline CL is expressed by nodes N[n] and links L[n]. For example, an intersection between a link L[3] connecting a node N[3] and a node N[4] and a perpendicular line perpendicularly drawn from the reference point P to the link is defined as Q. The point Q is set as a point perpendicular to the perpendicular line on the link L[n] (the link L[3] in this embodiment) perpendicular to the perpendicular line from the reference point P. The conversion unit 112 stores the coordinates (Px,Py) of the reference point P and the distance from the reference point P to the point Q in the storage unit 130.

Figures 6, 7:
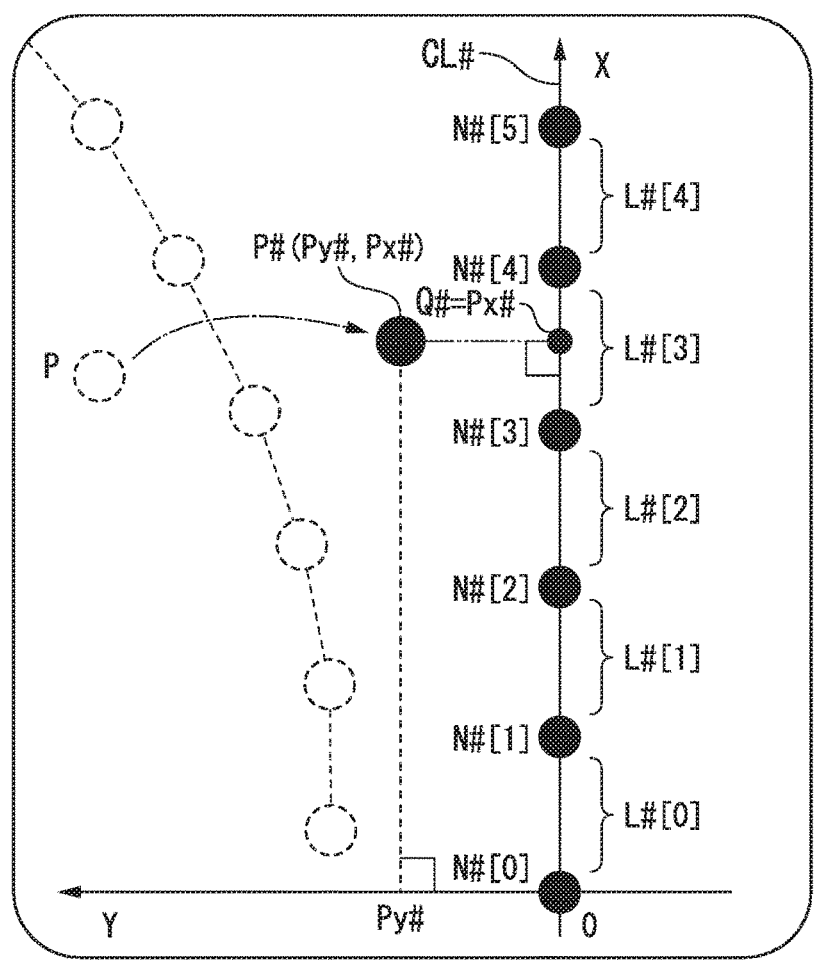
FIG. 6 is a diagram illustrating an example of information which is correlated with links in a road centerline.
FIG. 7 is a diagram illustrating a state in which nodes and links constituting a road centerline are moved onto an X coordinate axis.

The conversion unit 112 stores distances between the nodes N[n], that is, the lengths of the links L[n], and angles with respect to other links in the storage unit 130. FIG. 6 is a diagram illustrating an example of information which is correlated with the links L[n] of the road centerline CL. In the example illustrated in FIG. 6, each link L[k] is corrected with an angle thereof with respect to the previous link L[k−1] or a subsequent link L[k+1] and a length thereof (a distance between the node N[k] and the node N[k+1]). The angle with respect to the link L[0] may be set, for example, to the angle with respect to the road centerline CL. The conversion unit 112 derives the parameters illustrated in FIG. 6 in the course of performing the conversion process and stores the derived parameters as table data in the storage unit 130. The conversion unit 112 may store a function or a graph (a map) corresponding to the table data instead of the table data in the storage unit 130.

The conversion unit 112 virtually moves the nodes and the links on the X coordinate axis with the node N[0] as an origin O while maintaining the order of the nodes N[n] constituting the road centerline CL, the lengths of the links L[n], and the distance between the reference point P and the point Q.

FIG. 7 illustrates a state in which the nodes N[n] and the links L[n] constituting the road centerline CL are moved onto the X coordinate axis. As illustrated in FIG. 7, after the conversion has been performed, the road centerline CL is expressed by CL #, the reference point P is expressed by P #, the point Q is expressed by Q #, the node N[n] is expressed by N #[n], and the link L[n] is expressed by L #[n]. The link L #[n] is an example of a "divided line." The distance (=Px #) from the origin Q to the point Q # corresponds to a total length of the length of the link L[0], the length of the link [1], the length of the link L[2], and the length of the link between the node N[3] and the point Q in FIG. 5. The distance (=Py #) between the reference point P # and the point Q # corresponding to the distance between the reference point P and the point Q before the conversion has been performed. The conversion unit 112 stores the distance (=Px #) from the origin O to the point Q # and the distance (=Py #) between the reference point P # and the point Q # as coordinates of the reference point P # after the conversion has been converted in the storage unit 130.

The conversion unit 112 performs a process of converting other line markings such as lane side lines into a rectilinear shape to convert the line markings into a rectilinear shape. At this time, the conversion unit 112 sets the distances in the width direction between the road centerline CL and the other line markings to be constant before and after conversion into the rectilinear shape. Accordingly, the conversion unit 112 converts the whole road including the lane in which the host vehicle M travels into a rectilinear shape.

The process flow will be described again with reference back to the flowchart illustrated in FIG. 3. Then, the traveling path generating unit 115 sets a start point and an end point of a traveling path on the road converted by the conversion unit 112 and generates a traveling path based on the shape of the road. The traveling path generating unit 115 sets the current position of the host vehicle as a start point Ps, sets the target point output from the target point setting unit 113 as an end point Pe, and performs an arithmetic operation based on a spline function (Step S104).

Figure 8:
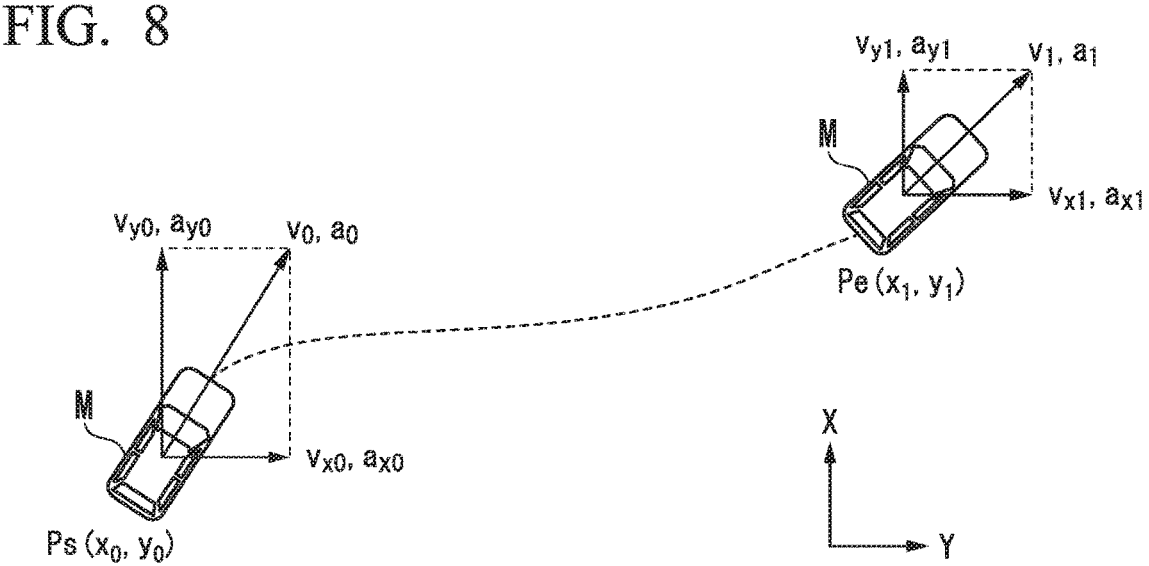
FIG. 8 is a diagram illustrating a state in which a traveling path is calculated by a traveling path generating unit according to the first embodiment.

FIG. 8 is a diagram illustrating an arithmetic operation of calculating a traveling path which is performed by the traveling path generating unit 115 according to the first embodiment. In FIG. 8, a space in which the host vehicle M is present is expressed by XY coordinates. The traveling path generating unit 115 calculates a curve for interpolation from the start point Ps to the end point Pe.

As illustrated in FIG. 8, it is assumed that the speed of the host vehicle M at the coordinates $(x_0,y_0)$ of the start point Ps is $v_0$ and the acceleration thereof is $a_0$. The speed $v_0$ of the host vehicle M is a velocity vector into which the x-direction component $v_{x0}$ and the y-direction component $v_{y0}$ of the speed are combined. The acceleration $a_0$ of the host vehicle M is an acceleration vector into which the x-direction component $a_{x0}$ and the y-direction component $a_{y0}$ of the acceleration are combined. It is assumed that the speed of the host vehicle M at the coordinates $(x_1,y_1)$ of the end point Pe is $v_1$ and the acceleration thereof is $a_1$. The speed $v_1$ of the host vehicle M is a velocity vector into which the x-direction component $v_{x1}$ and the y-direction component $v_{y1}$ of the speed are combined. The acceleration $a_1$ of the host vehicle M is an acceleration vector into which the x-direction component $a_{x1}$ and the y-direction component $a_{y1}$ of the acceleration are combined.

The traveling path generating unit 115 sets a target point (x,y) for each time t in a period in which a unit time T in which the host vehicle M reaches the end point Pe from the start point Ps elapses. An arithmetic operation expression of the target point (x,y) is expressed by spline functions of Equations (1) and (2).

[Math. 1]

$$x{:}f(t) = m_5 t^5 + m_4 t^4 + m_3 t^3 + \frac{1}{2}a_{x0}t^2 + k_1 v_{x0} t + x_0 \tag{1}$$

[Math. 2]

$$y{:}f(t) = m_5 t^5 + m_4 t^4 + m_3 t^3 + \frac{1}{2}a_{y0}t^2 + k_2 v_{y0} t + y_0 \tag{2}$$

In Equations (1) and (2), $m_5$, $m_4$, and $m_3$ are expressed by Equations (3), (4), and (5), respectively. Coefficients $k_1$ and $k_2$ in Equations (1) and (2) may be equal to each other or different from each other.

[Math. 3]

$$m_5 = -\frac{12p_0 - 12p_1 + 6v_0 T + 6v_1 T + a_0 T^2 - a_1 T^2}{2T^5} \tag{3}$$

[Math. 4]

$$m_4 = \frac{30p_0 - 30p_1 + 16v_0 T + 14v_1 T + 3a_0 T^2 - 2a_1 T^2}{2T^4} \tag{4}$$

[Math. 5]

$$m_3 = -\frac{20p_0 - 20p_1 + 12v_0 T + 8v_1 T + 3a_0 T^2 - a_1 T^2}{2T^3} \tag{5}$$

In Equations (3), (4), and (5), $p_0$ denotes the position $(x_0,y_0)$ of the host vehicle M at the start point Ps and $p_1$ denotes the position $(x_1,y_1)$ of the host vehicle M at the end point Pe.

The traveling path generating unit 115 substitutes a value obtained by multiplying the vehicle speed acquired by the vehicle state acquiring unit 114 by a gain into $v_{x0}$ and $v_{y0}$ in Equations (1) and (2) and acquires a target point (x(t),y(t))

which is specified by the calculation result of Equations (1) and (2) every time t of the unit time T. Accordingly, the traveling path generating unit 115 acquires a spline line by interpolation between the start point Ps and the end point Pe using a plurality of target points (x(t),y(t)).

Figure 9:
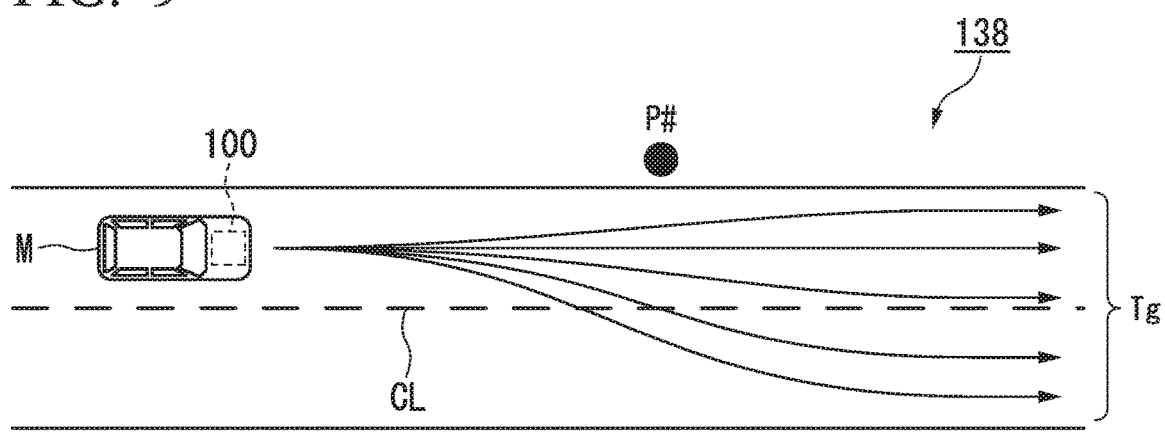
FIG. 9 is a diagram illustrating an example of traveling paths (spline curves) which are generated on a road having a rectilinear shape.

FIG. 9 is a diagram illustrating an example of traveling paths (spline curves) which are generated on a road having a rectilinear shape. The traveling path generating unit 115 outputs the spline curves illustrated in FIG. 9 as traveling paths Tg to the inverse conversion unit 116. When a traveling path protruding from the road having a rectilinear shape is present, the traveling path generating unit 115 may output the traveling paths Tg from which the protruding traveling path is excluded in advance to the inverse conversion unit 116. The traveling path generating unit 115 may generate the traveling paths Tg such that the host vehicle M travel on the left side of the road centerline CL or may generate the traveling paths Tg such that the host vehicle M does not move to depart the road from the reference point P. When the reference point P is an object with which the host vehicle M should not come in contact, the traveling path generating unit 115 generates the traveling paths Tg such that the host vehicle does not come in contact with the reference point P.

The inverse conversion unit 116 generates the traveling paths Tg # of the host vehicle M in the shape of the road which has not been converted into a rectilinear shape by the conversion unit 112 by performing inverse conversion of the conversion performed by the conversion unit 112 on the traveling paths Tg generated on the shape having a rectilinear shape by the traveling path generating unit 115 (Step S106).

The inverse conversion unit 116 inversely converts the road having a rectilinear shape into the original shape of the road on the basis of the coordinates of the reference point P, the coordinates of the reference point P #, and the information correlated with the links L[n] (for example, the table data illustrated in FIG. 6). For example, the inverse conversion unit 116 expresses the spline curves generated by the traveling path generating unit 115 as the traveling paths Tg by sequences of points having a predetermined width and sets sequences of points acquired by inversely converting the points as the traveling paths Tg #. Accordingly, the inverse conversion unit 116 inversely converts the rectilinear shape of the road into the original shape of the road and converts the traveling paths Tg generated on the road having the rectilinear shape to generate new traveling paths Tg # on the original road.

Figure 10:
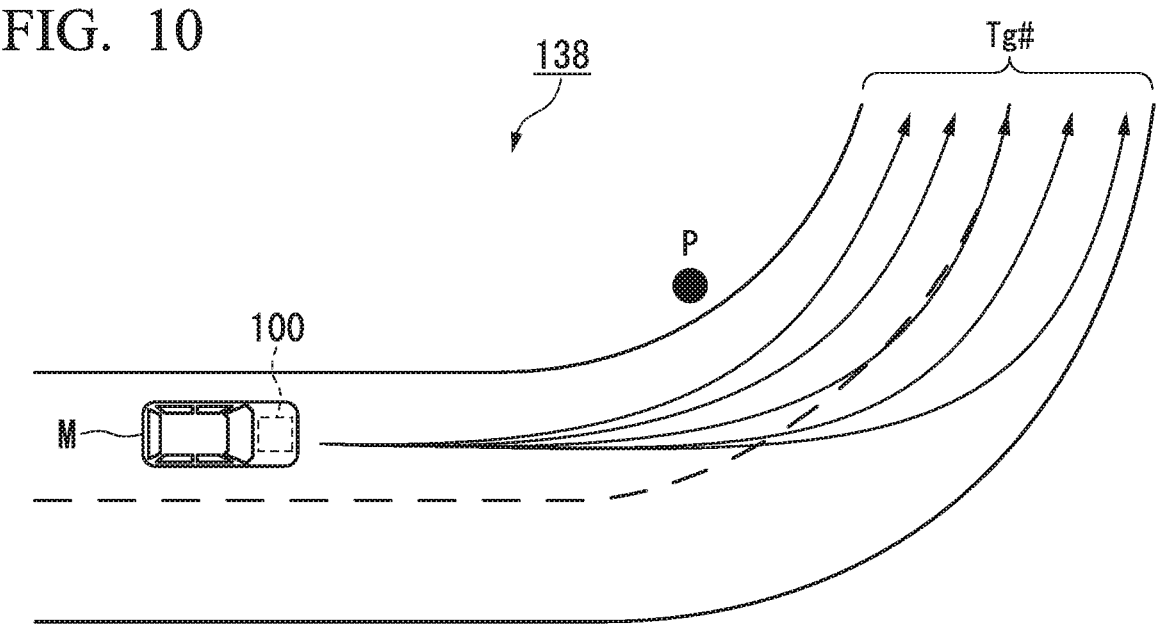
FIG. 10 is a diagram illustrating a state in which a road having a rectilinear shape along with traveling paths has been virtually inversely converted into an original shape of the road.

FIG. 10 is a diagram illustrating a state in which a rectilinear shape of a road along with the traveling paths Tg is virtually inversely converted into the original shape of the road. The inverse conversion unit 116 outputs the generated traveling paths Tg # to the traveling control unit 120 (Step S108).

The traveling control unit 120 sets the control mode to the automatic driving mode or the manual driving mode under the control of the control switching unit 122, and controls a control target on the basis of the set control mode. The traveling control unit 120 reads the action plan information 136 generated by the action plan generating unit 104 in the automatic driving mode and controls a control target on the basis of the action plan information 136 and the traveling paths Tg #. The traveling control unit 120 determines a control value (for example, a rotation speed) of an electric motor in the steering device 52 and a control value (for example, a throttle valve opening degree or a shift stage) of the ECU in the travel driving force output device 50 such that the host vehicle M travels along the traveling path Tg # on the basis of the action plan.

Figure 11:
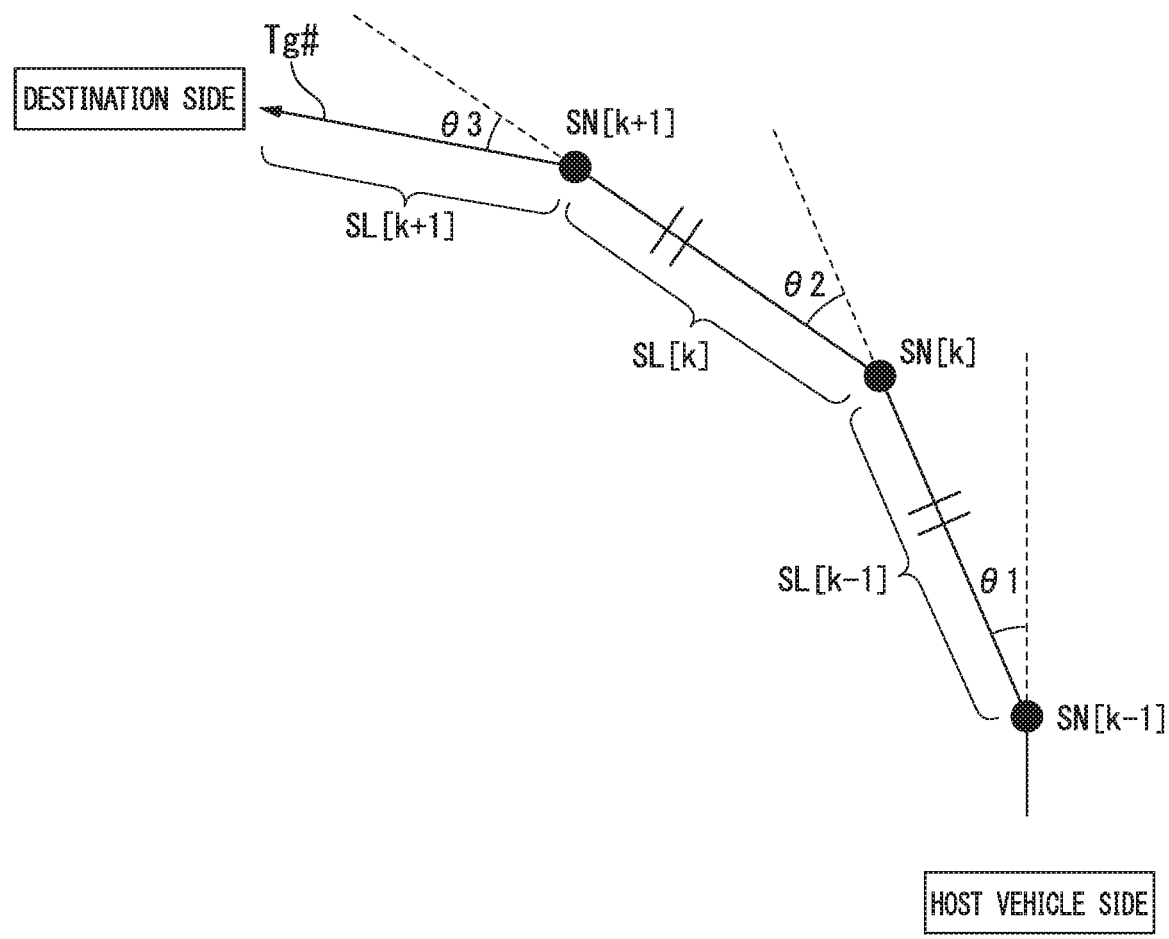
FIG. 11 is a diagram illustrating an example of a control value determining method based on a traveling path.

FIG. 11 is a diagram illustrating an example of a method of determining a control value based on a traveling path Tg #. The traveling path Tg # is expressed by nodes SN[n] and links SL[n]. The traveling control unit 120 determines the control value of the electric motor in the steering device 52 and the control value of the ECU in the travel driving force output device 50, for example, on the basis of the angle θ formed by the link SL[k] and the link SL[k+1] or the link SL[k−1] and the lengths of the links.

As illustrated in FIG. 11, the traveling control unit 120 determines the control value of the electric motor in the steering device 52 such that the steering angle reaches an angle corresponding to the angle θ1 between the nodes SN[k−1] and SN[k], and determines the control value of the electric motor in the steering device 52 such that the steering angle reaches an angle corresponding to the angle θ2 between the nodes SN[k] and SN[k+1].

The traveling control unit 120 outputs information indicating the above-determined control value to a corresponding control target. Accordingly, the devices (50, 52, and 54) as the control targets can control the devices on the basis of the information indicating the control value input from the traveling control unit 120. The traveling control unit 120 appropriately adjusts the determined control values on the basis of the detection results of the vehicle sensor 20.

The traveling control unit 120 controls the control target on the basis of the operation detection signal output from the operation detection sensor 32 in the manual driving mode. For example, the traveling control unit 120 outputs the operation detection signal output from the operation detection sensor 32 to the devices as the control targets without any change.

The control switching unit 122 switches the control mode of the host vehicle by the traveling control unit 120 from the automatic driving mode to the manual driving mode or from the manual driving mode to the automatic driving mode on the basis of the action plan information 136 which is generated by the action plan generating unit 104 and stored in the storage unit 130. The control switching unit 122 switches the control mode of the host vehicle M by the traveling control unit 120 from the automatic driving mode to the manual driving mode or from the manual driving mode to the automatic driving mode on the basis of the control mode designation signal input from the switch 40. That is, the control mode of the traveling control unit 120 can be arbitrarily changed during travel or during parking by a driver's operation or the like.

The control switching unit 122 switches the control mode of the host vehicle M by the traveling control unit 120 from the automatic driving mode to the manual driving mode on the basis of the operation detection signal input from the operation detection sensor 32. For example, when the amount of operation included in the operation detection signal is greater than a threshold value, that is, when the operation device 30 is operated with an amount of operation greater than the threshold value, the control switching unit 122 switches the control mode of the traveling control unit 120 from the automatic driving mode to the manual driving mode. For example, when the host vehicle M travels automatically by the traveling control unit 120 set to the automatic driving mode and the steering wheel the accelerator pedal, or the brake pedal is operated with an amount of operation greater than the threshold value by a driver, the control switching unit 122 switches the control mode of the traveling control unit 120 from the automatic driving mode to the manual driving mode. Accordingly, the vehicle controller 100 can immediately switch the driving mode without performing an operation of the switch 40 due to an operation which is instantaneously performed by a driver when an object such as a person runs away to a road or a preceding vehicle stops suddenly. As a result, the vehicle controller 100 can cope with an emergency operation by a driver and enhance safety during travel.

Since the vehicle controller 100 according to the above-mentioned first embodiment includes the conversion unit 112 that generates the virtual road information 138 in which a shape of a road has been converted into a rectilinear shape on the basis of the map information 132 including information indicating the shape of the road, the traveling path generating unit 115 that generates a traveling path Tg of the host vehicle M on the road having a rectilinear shape which is expressed by the virtual road information 138 generated by the conversion unit 112, and the inverse conversion unit 116 that generates the traveling path of the host vehicle M in the shape of the road which has not been converted into the rectilinear shape by the conversion unit 112 by performing inverse conversion of the conversion performed by the conversion unit 112 on the traveling path Tg generated on the road having the rectilinear shape by the traveling path generating unit 115, it is possible to generate a traveling path suitable for a shape of a road with a small arithmetic operation load.

According to the first embodiment, since the vehicle controller 100 generates the traveling path Tg on the basis of the spline function as an example of the geometric curve interpolating method, it is possible to generate a traveling path which is more suitable for an actual shape of a road.

Second Embodiment

A second embodiment will be described below. A vehicle controller 100A according to the second embodiment is different from that of the first embodiment, in that the host vehicle M travels under a constraint condition based on a curvature of a road when an object interfering with traveling of the host vehicle M is present. Such a difference will be mainly described below.

Figure 12:
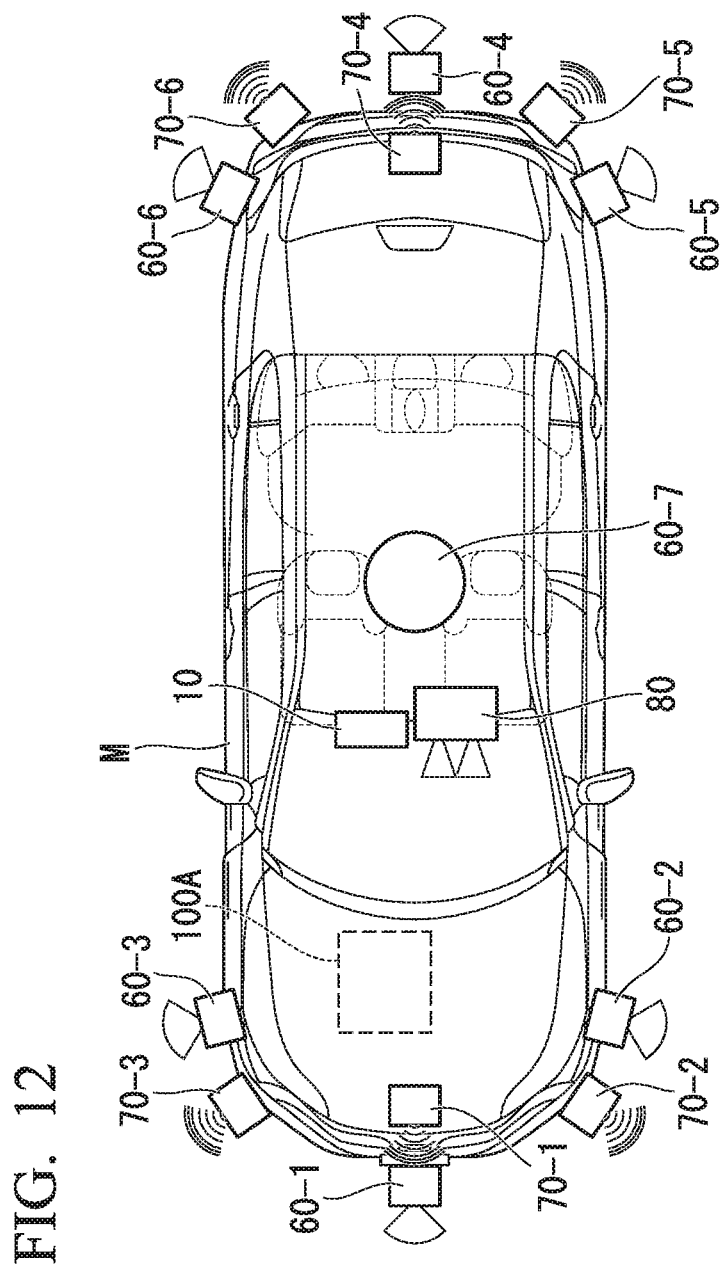
FIG. 12 is a diagram illustrating elements of a host vehicle in which a vehicle controller according to a second embodiment is mounted.

FIG. 12 is a diagram illustrating elements of a host vehicle M in which the vehicle controller 100A according to the second embodiment is mounted. As illustrated in FIG. 12, a navigation device 10, sensors such as finders 60-1 to 60-7, radars 70-1 to 70-6, and a camera 80, and the vehicle controller 100A are mounted in the host vehicle M.

The finders 60-1 to 60-7 is, for example, LIDARs (light detection and ranging or laser imaging detection and ranging) that measure scattered light of irradiation light and measure a distance to an object. For example, the finder 60-1 is attached to a front grill or the like, and the finders 60-2 and 60-3 are attached to side surfaces of a vehicle body, door mirrors, insides of head lamps, the vicinities of side marker lamps, and the like. The finder 60-4 is attached to a trunk lid or the like, and the finders 60-5 to 60-6 are attached to the side surfaces of the vehicle body or insides of tail lamps. The finders 60-1 to 60-6 have, for example, a detection range of about 150 degrees in the horizontal direction. The finder 60-7 is attached to a roof or the like.

The finder 60-7 has, for example, a detection range of 360 degrees in the horizontal direction.

The radars 70-1 and 70-4 are, for example, long-range millimeter wave radars of which a detection range in the depth direction is wider than those of the other radars. The radars 70-2, 70-3, 70-5, and 70-6 are middle-range millimeter wave radars of which a detection range in the depth direction is narrower than those of the radars 70-1 and 70-4.

When the finders 60-1 to 60-7 are not particularly distinguished, the finders 60-1 to 60-7 are referred to as the "finder 60." When the radars 70-1 to 70-6 are not particularly distinguished, the radars 70-1 to 70-6 are referred to as the "radar 70." The radar 70 detects an object, for example, using a frequency modulated continuous wave (FM-CW) method.

The camera 80 is, for example a digital camera using an individual imaging device such as a charge coupled device (CCD) or a complementary metal oxide semiconductor (CMOS). The camera 80 is attached to an upper part of a front window shield or a back surface of a room mirror. The camera 80 images the front of the host vehicle M, for example, periodically and repeatedly. The camera 80 may be a stereoscopic camera including a plurality of cameras.

The configuration illustrated in FIG. 12 is only an example, and part of the configuration may be omitted or another configuration may be added thereto.

Figure 13:
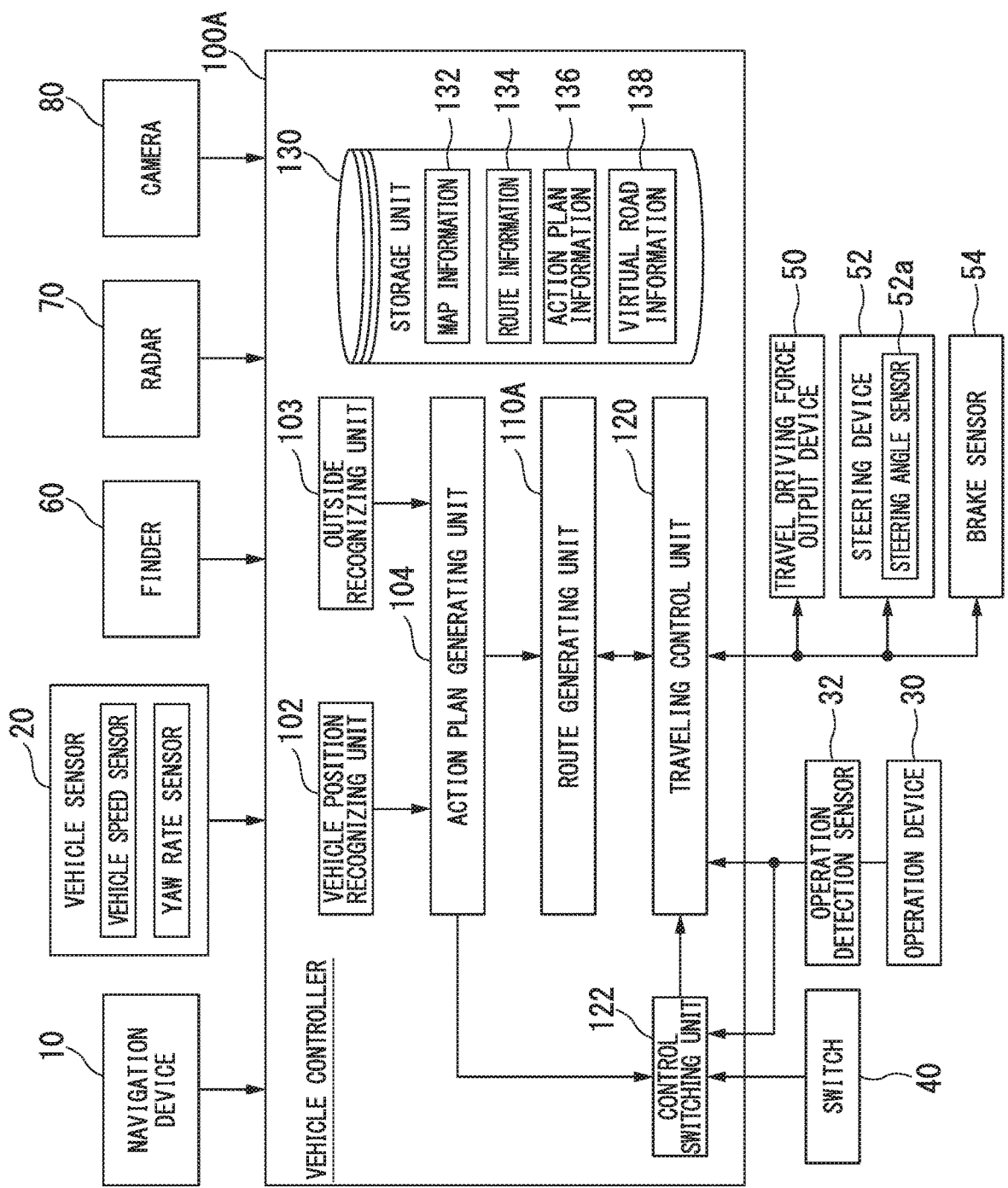
FIG. 13 is a diagram illustrating a functional configuration of the host vehicle in which the vehicle controller according to the second embodiment is mounted.

FIG. 13 is a diagram illustrating a functional configuration of the host vehicle M in which the vehicle controller 100A according to the second embodiment is mounted. A navigation device 10, a vehicle sensor 20, operation devices (operators) 30 such as an accelerator pedal, a brake pedal, a shift lever (or a pedal shift), and a steering wheel, operation detection sensors 32 such as a throttle valve opening degree sensor, a brake depression amount sensor (a brake switch), a shift position sensor, and a steering angle sensor (or a steering torque sensor), a switch 40, a travel driving force output device 50, a steering device 52, a brake device 54, a finder 60, a radar 70, a camera 80, and a vehicle controller 100A are mounted in the host vehicle M. The devices or instruments are connected to each other via a multiple communication line such as a controller area network (CAN) communication line, a serial communication line, or a wireless communication network. The above-described operation devices are only examples, and a joystick, a button, a dial switch, a GUI switch, and the like may be mounted in the host vehicle M.

[Vehicle Control System]

The vehicle controller 100A according to the second embodiment will be described below. The vehicle controller 100A is embodied, for example, by one or more processors or hardware having a function equivalent thereto. The vehicle controller 100A may be configured by combination of an ECU in which a processor such as a CPU, a storage device, and a communication interface are connected to each other via an inner bus or a micro processing unit (MPU).

The vehicle controller 100A includes, for example, a vehicle position recognizing unit 102, an outside recognizing unit 103, an action plan generating unit 104, a route generating unit 110A, a traveling control unit 120, a control switching unit 122, and a storage unit 130. Some or all of them are embodied by causing a processor to execute a program (software). Some or all of them may be embodied by hardware such as an LSI or an ASIC or may be embodied in combination of hardware and software.

The outside recognizing unit 103 recognizes a state such as a position, a speed, and an acceleration of a neighboring vehicle on the basis of information input from the finders 60, the radars 70, the camera 80, and the like. A neighboring vehicle is, for example, a vehicle which travels around the host vehicle M and is a vehicle which travels in the same direction as the host vehicle M. The position of a neighboring vehicle may be represented by a representative point such as a center or a corner of another vehicle or may be represented by an area which is expressed by an outline of another vehicle. The "state" of a neighboring vehicle may include an acceleration of the neighboring vehicle and information on whether the neighboring vehicle is changing its lane (or whether the neighboring vehicle is about to change its lane) which can be understood on the basis of information of the above-mentioned various devices. The outside recognizing unit 103 may recognize positions of a guard rail, a telephone pole, a parked vehicle, a pedestrian, and another object in addition to a neighboring vehicle.

When there is an object that interferes with traveling of the host vehicle M in a lane (a traveling lane) in which the host vehicle M travels among the recognized objects, the outside recognizing unit 103 recognizes the object as an obstacle OB. Examples of the obstacle OB include a stopped neighboring vehicle, a fallen object, a construction area, and a pedestrian.

Figure 14:
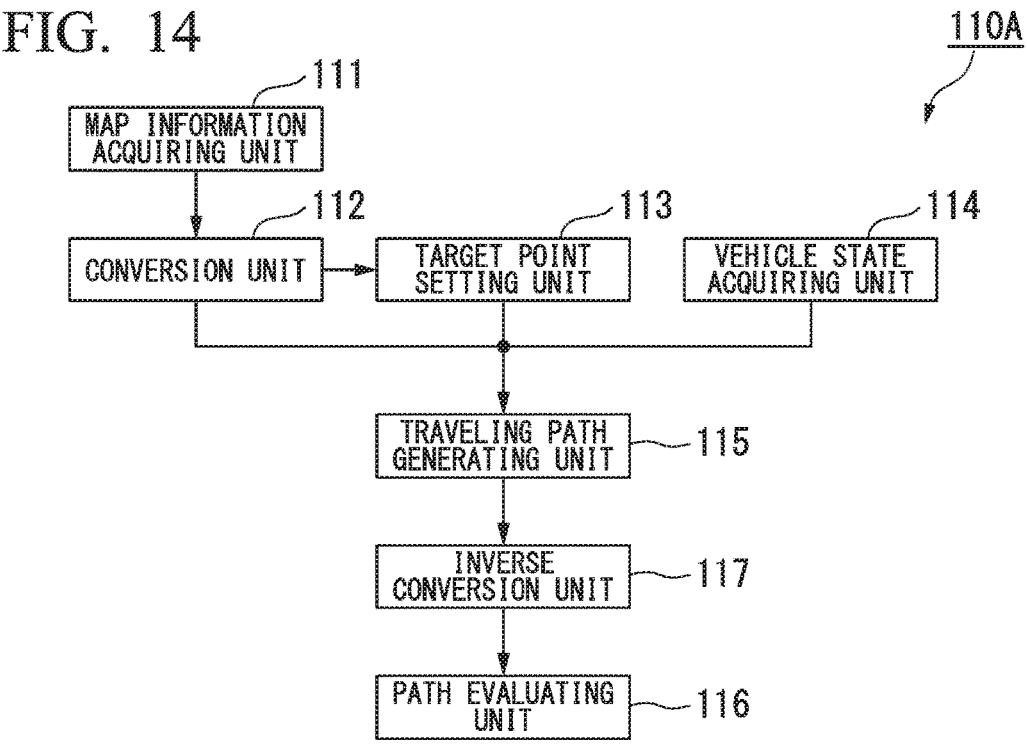
FIG. 14 is a block diagram illustrating a functional configuration of a route generating unit according to the second embodiment.

FIG. 14 is a block diagram illustrating a functional configuration of the route generating unit 110A according to the second embodiment. The route generating unit 110A according to the second embodiment includes a map information acquiring unit 111, a conversion unit 112, a target point setting unit 113, a vehicle state acquiring unit 114, a traveling path generating unit 115, an inverse conversion unit 116, and a path evaluating unit 117.

The conversion unit 112 according to the second embodiment sets a plurality of reference points P on a road to be converted or in the vicinity of the road before converting a shape of the road into a rectilinear shape. For example, the conversion unit 112 sets a plurality of reference points P at equal intervals or unequal intervals along a road side line SL. In this case, for example, nodes N indicating the road side line SL are considered as the reference points P. Similarly to the first embodiment, the reference points P may be set to coordinate points on the road centerline CL on a road or may be set to coordinate points of an object such as a sign other than the road.

Figure 15:
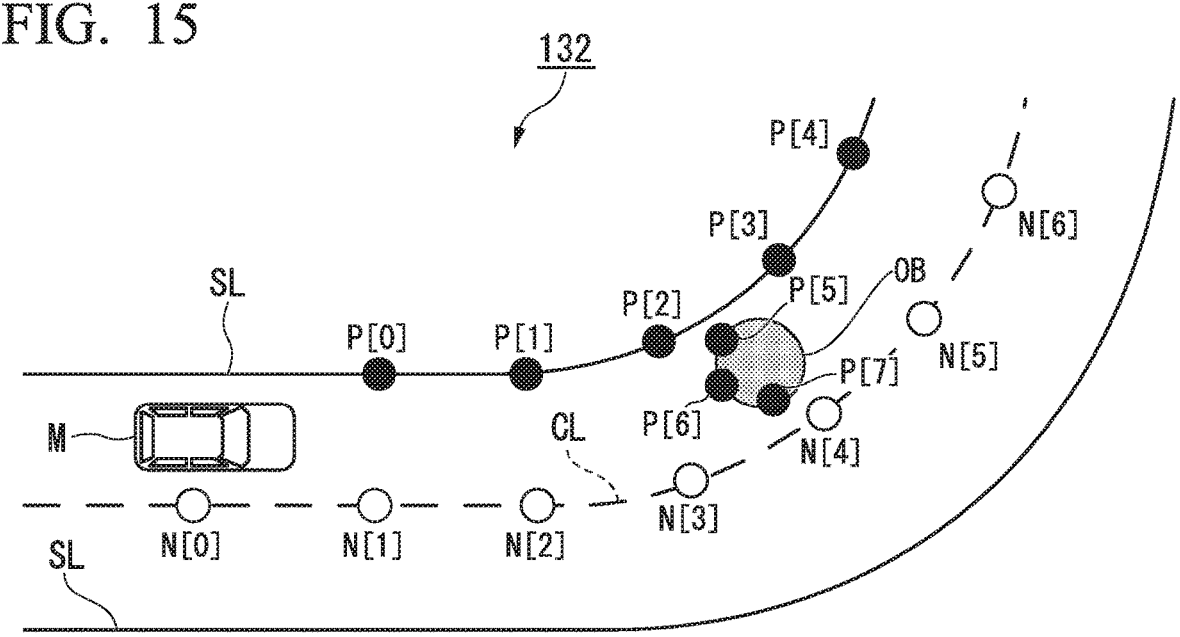
FIG. 15 is a diagram illustrating an example of a scene in which a plurality of reference points are set by a conversion unit.

FIG. 15 is a diagram illustrating an example of a scene in which a plurality of reference points P are set by the conversion unit 112. In the example illustrated in FIG. 15, a road is curved to left with respect to the traveling direction of the vehicle and the road side line SL is also curved in the same way. Accordingly, the conversion unit 112 sets a plurality of reference points P along the left road side line SL when viewed from the host vehicle M. In the illustrated example, the conversion unit 112 sets the reference points P[0] to P[4].

The conversion unit 112 stores a length (a distance) of a perpendicular line, which is perpendicular to a link L[n] indicating the road centerline CL, passing through each reference point P for each combination of the reference points and the links L[n] in the storage unit 130. For example, when the perpendicular line of the link L[1] passes through the reference point P[0], the conversion unit 112 stores the length of the perpendicular line in the storage unit 130 in correlation with the combination of the link L[1] and the reference point P[0]. The conversion unit 112 stores position information indicating what position the perpendicular line (a perpendicular line viewed from the link L[n]) drawn from the reference point P to the link L[n] intersects in the storage unit 130 in correlation with the link L[n].

The conversion unit 112 converts the road centerline CL to a rectilinear shape by virtually moving the road centerline CL onto the X coordinate axis with the node N[0] as an origin O while maintaining the order of the nodes N[n] and the lengths of the links L[n] constituting the road centerline CL. The conversion unit 112 sets the position of the reference point P correlated with each link L[n] to a position shifted by the stored length of the perpendicular line in a direction perpendicular to the link L[n] from a position at which the link L[n] and the perpendicular line intersect each other.

The conversion unit 112 performs, for example, a process of converting other line markings such as a right road side line SL illustrated in FIG. 15 into a rectilinear shape. At this time, the conversion unit 112 may set distances in the width direction between the road centerline CL and the other line markings to be constant before and after conversion into the rectilinear shape.

For example, in FIG. 15, the conversion unit 112 may convert the road side line SL on which the reference points P are not set into a rectilinear shape such that distances between the nodes N indicating the road centerline CL and the nodes N indicating the road side line SL (the road side line SL on which the reference points P are not set) which interposes the road centerline CL along with the road side line SL on which the reference points P are set are constant before and after the conversion. The invention is not limited thereto, but the reference points P may be set on the right road side line SL as will be described later. The road side line SL on which the reference points P are set is converted into a rectilinear shape due to position changes of the reference points P that move with conversion of the road centerline CL into a rectilinear. Accordingly, the conversion unit 112 converts a whole road including the lane in which the host vehicle M travels into a rectilinear shape.

The conversion unit 112 sets the reference points P to correspond to the shape of the obstacle OB recognized by the outside recognizing unit 103 and converts the shape of the obstacle OB recognized by the outside recognizing unit 103 in addition to converting the shape of the road into a rectilinear shape. For example, when a partial area of the appearance of the obstacle OB is recognized by the outside recognizing unit 103, the conversion unit 112 sets the reference points P on the basis of the partial area. Examples of the partial area of the appearance of the obstacle OB include part of a reflecting surface that reflects light applied from the finders 60, part of a reflecting surface that reflects radio waves transmitted from the radars 70, and part of an outer surface of an object imaged by the camera 80.

The conversion unit 112 converts the shape of the obstacle OB while maintaining the order of the nodes N[n] constituting the road centerline CL, the lengths of the links L[n], and the length of the perpendicular lines of the links L[n] passing through the reference points P. In the example illustrated in FIG. 15, the conversion unit 112 sets reference points P[5] to P[7] along the shape of the obstacle OB. The reference points P[5] to P[7] in the drawing are set in a partial area of the appearance of the obstacle OB recognized by the outside recognizing unit 103. That is, the reference points are set in an area measured by the finders 60, the radars 70, or the camera 80.

The conversion unit 112 may estimate a dead-angle part of the obstacle OB which is not measured by the finders 60, the radars 70, or the camera 80 on the basis of the measured parts. More specifically, the conversion unit 112 estimates what object the obstacle OB is by comparing arrangement of feature points extracted from a partial area of the appearance of the obstacle OB with arrangement of principal feature points of various objects stored in the storage unit 130 as learning data in advance, and estimates the whole shape of the obstacle OB from the possible shape of the estimated object. For example, when the obstacle OB is a vehicle, the conversion unit 112 estimates the whole shape of the vehicle which is the obstacle OB by estimating the total length of the vehicle from the vehicle width of the rear end of the vehicle or the vehicle height. In FIG. 15, part in which no reference point P is set in the area of the obstacle OB corresponds to the estimated dead-angle part.

Similarly to the first embodiment, the traveling path generating unit 115 performs fitting of a spline curve in the road converted by the conversion unit 112 and generates a plurality of traveling paths Tg (obstacle-avoiding traveling paths) avoiding the obstacle OB. For example, the traveling path generating unit 115 generates the traveling paths Tg in which the host vehicle M changes the traveling lane to a neighboring lane thereof immediately before the obstacle OB. At this time, the traveling path generating unit 115 generates the traveling paths Tg such that the traveling paths do not interfere with the obstacle OB. "Not interfere" means, for example, that a passing area in consideration of the vehicle width W of the host vehicle M centered on the traveling paths Tg does not overlap an area indicating the obstacle OB. The passing area in consideration of the vehicle width W of the host vehicle M may have a margin such that a gap between the host vehicle M and the obstacle OB increases more.

Figure 16:
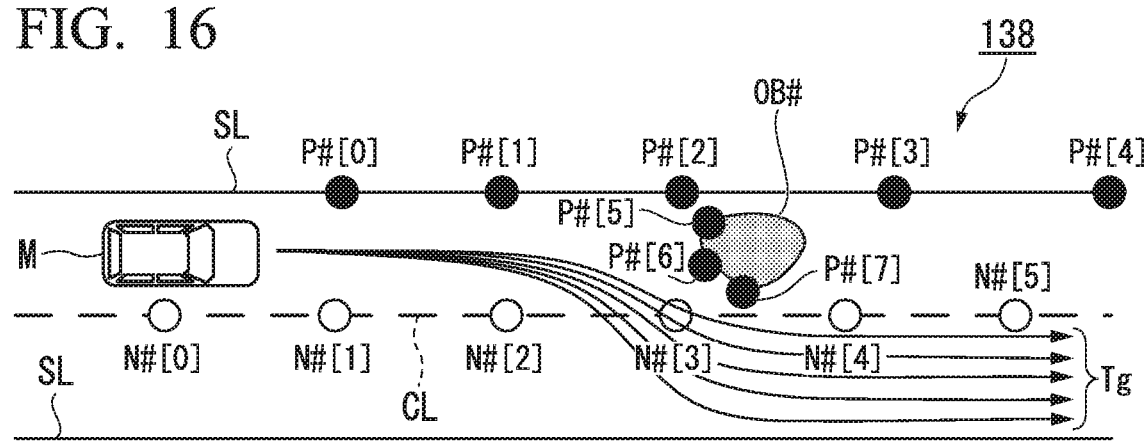
FIG. 16 is a diagram illustrating a state in which traveling paths are generated on a virtual road which has been converted into a rectilinear shape from the scene illustrated in FIG. 15.

FIG. 16 is a diagram illustrating a state in which the traveling paths Tg are generated on a virtual road in which the scene illustrated in FIG. 15 has been converted into a rectilinear shape. In the drawing, OB # is obtained by conversion of the obstacle OB.

[Control of Centrifugal Acceleration]

The path evaluating unit 117 derives a supposed centrifugal acceleration G of the host vehicle M for each sampling point on the traveling paths Tg generated by the traveling path generating unit 115 and evaluates the traveling paths Tg on the basis of the centrifugal acceleration G The centrifugal acceleration G is an acceleration in a vehicle width direction applied to a vehicle or an occupant in the vehicle, for example, when the host vehicle M is turned by causing the host vehicle M to travel along the traveling paths Tg. The centrifugal acceleration G is derived, for example, on the basis of the radius of the lane, the speed of the host vehicle M, and a curvature based on a turning angle.

For example, as illustrated in FIG. 16, the plurality of traveling paths Tg has different curvatures indicating a degree of curve and the traveling path Tg having a larger curvature (a smaller radius of curvature) is likely to have a larger centrifugal acceleration G When the traveling path Tg having a large centrifugal acceleration G is inversely converted to correspond to the original shape of the road, the curvature increases more and the centrifugal acceleration G is likely to increase. In this case, a burden may be forcibly applied to an occupant such as a driver. The centrifugal acceleration G is expressed by Equation (6). In the equation, r denotes a radius of curvature, and 1/r denotes a curvature. The path evaluating unit 117 may derive a centrifugal force by multiplying a vehicle weight by the centrifugal acceleration G instead of using the centrifugal acceleration G and evaluate the traveling paths Tg. The speed v may be assumed to be kept constant from a time point at which the speed of the host vehicle M is calculated, or may be derived on the assumption that an acceleration or a jerk is kept constant.

[Math. 6]

$$G=v^2+(1/r) \quad (6)$$

Since a turning direction may be cancelled by the inverse conversion and the curvature may decrease, the path evaluating unit 117 changes a threshold value for the centrifugal acceleration G on the basis of the direction of a curve. The path evaluating unit 117 predicts a conversion process by the inverse conversion unit 116, sets a threshold value for the centrifugal acceleration G in advance, and selects only the traveling path Tg in which the centrifugal acceleration G derived for each point enters a range of the threshold value among the plurality of traveling paths Tg generated by the traveling path generating unit 115.

Figure 17:
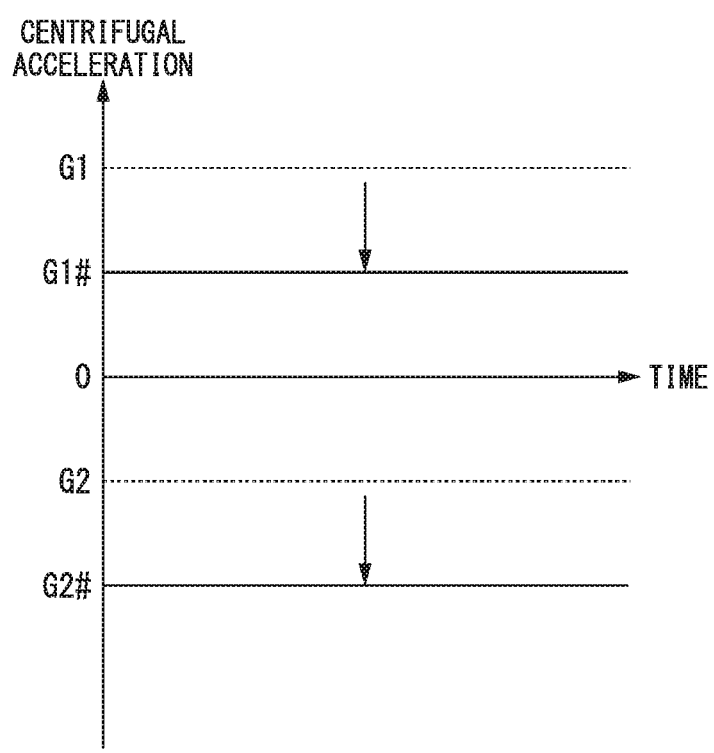
FIG. 17 is a diagram illustrating a centrifugal acceleration threshold value which is set by a path evaluating unit.

FIG. 17 is a diagram illustrating a threshold value for the centrifugal acceleration G which is set by the path evaluating unit 117. This drawing illustrates a threshold value which is used when the host vehicle M travels in a curved road which is curved to left. In the drawing, the horizontal axis represents time, and the vertical axis represents centrifugal acceleration. A positive centrifugal acceleration indicates an acceleration which is generated, for example, when a vehicle turns to left with respect to the traveling direction of the vehicle and a negative centrifugal acceleration indicates an acceleration which is generated, for example, when the vehicle turns to right with respect to the traveling direction of the vehicle.

In FIGS. 17, G1, and G2 denote threshold values for the centrifugal acceleration G which are used when conversion is not performed, and G1# and G2# are threshold values which are used when conversion is performed (that is, when the host vehicle M travels in a curved road). As illustrated in the drawing, when a point on a traveling path Tg on a virtual road having a rectilinear shape turns to left, the threshold value G1# for the centrifugal acceleration is set to be less than the threshold value G1 when conversion is not performed. As a result, when a vehicle turns to left, it is likely to be determined that "the centrifugal acceleration G is greater than the threshold value." A degree of change from the threshold value G1 to the threshold value G1# may be performed on the basis of the curvature of the road. The path evaluating unit 117 sets the degree of change from the threshold value G1 to the threshold value G1# to be larger as the curvature of the road becomes larger.

When the curvature indicating the shape of the non-converted road is not acquired from the map information 132, the path evaluating unit 117 may derive the curvature from an angle formed by the nodes N[k] and N[k+1] with reference to the links L[n] and the nodes N[n] indicating the road centerline CL. Here, k is an arbitrary natural number from "0" to "n−1."

On the other hand, when a point on the traveling path Tg on the virtual road having a rectilinear shape turns to right, the threshold value G2# for the centrifugal acceleration is set to have a larger absolute value than that of the threshold value G2 when conversion is not performed. As a result, when the vehicle turns to right, it is not likely to be determined that "the centrifugal acceleration G is greater than the threshold value." The degree of change from the threshold value G2 to the threshold value G2# may be changed on the basis of the curvature of the road. The path evaluating unit 117 sets the degree of change from the threshold value G2 to the threshold value G2# to be larger as the curvature of the road becomes larger.

When the host vehicle M travels on a curved road which is curved to right, the threshold value is set to be opposite to the tendency illustrated in FIG. 17. As a result, it is not likely to be determined that "the centrifugal acceleration G is greater than the threshold value" when the vehicle turns to left, and it is likely to be determined that "centrifugal acceleration G is greater than the threshold value" when the vehicle turns to right.

The inverse conversion unit 116 generates a traveling path Tg # of the host vehicle M in the shape of the road which has not been converted into a rectilinear shape by the conversion unit 112 by performing inverse conversion of the conversion performed by the conversion unit 112 on the traveling path Tg selected by the path evaluating unit 117.

Figure 18:
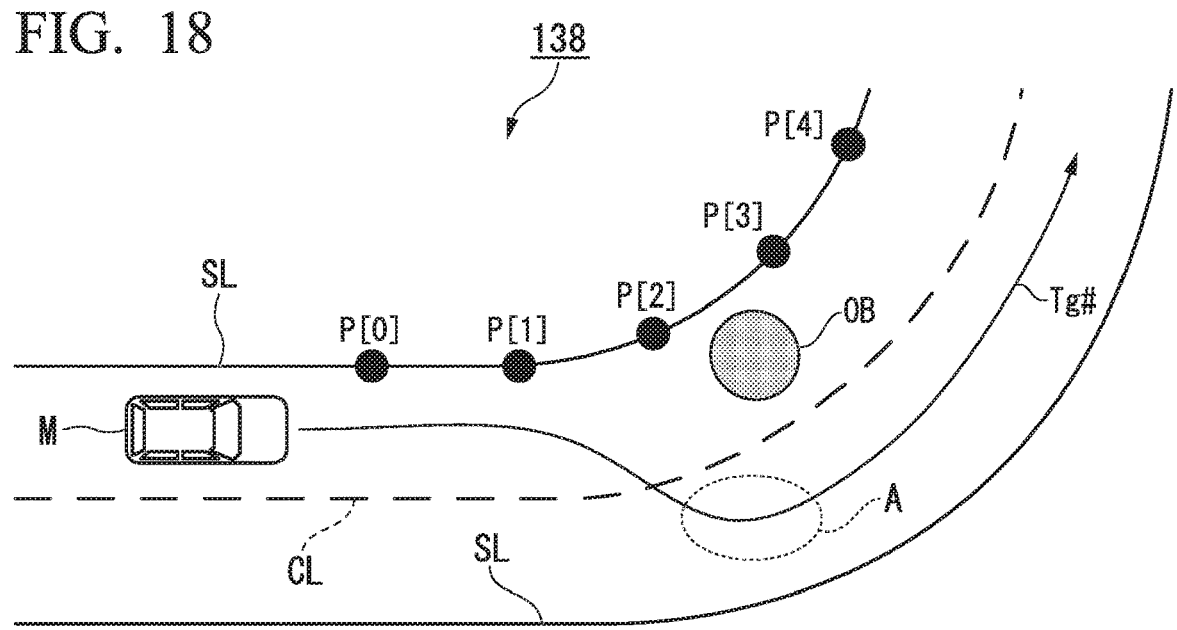
FIG. 18 is a diagram illustrating an example of a traveling path which is generated by inversely converting the traveling path selected by the path evaluating unit.

FIG. 18 is a diagram illustrating an example of a traveling path Tg # generated by inversely converting the traveling path Tg selected by the path evaluating unit 117. When the host vehicle M travels along the traveling path Tg # in the drawing, only the traveling path Tg in which the centrifugal acceleration G is less than the threshold value G1# is selected in advance before the virtual road having a rectilinear shape is converted to the road having an original curved shape by the inverse conversion unit 116, and thus sudden turning for avoidance of the obstacle OB is prevented from being performed, for example, in an area in which a turning angle increases as in A in the drawing. For example, a traveling path Tg # is selected such that the vehicle moves earlier to the right lane to avoid the obstacle OB. As a result, the centrifugal acceleration G decreases, and a burden on an occupant decreases.

[Adjustment of Traveling Path]

Since a plurality of reference points P are set by the conversion unit 112, a traveling path Tg # which is generated by inverse conversion using the inverse conversion unit 116 may have a loop shape. In this case, the inverse conversion unit 116 corrects the generated traveling path Tg # to a non-looped curve on the basis of an intersection of the traveling path Tg # in which a loop-shaped portion (a loop) is formed. For example, the inverse conversion unit 116 replaces a position at which the loop shape is formed with a predetermined path point (deletes the looped part) and corrects the traveling path Tg # to a non-looped curve.

Figure 19:
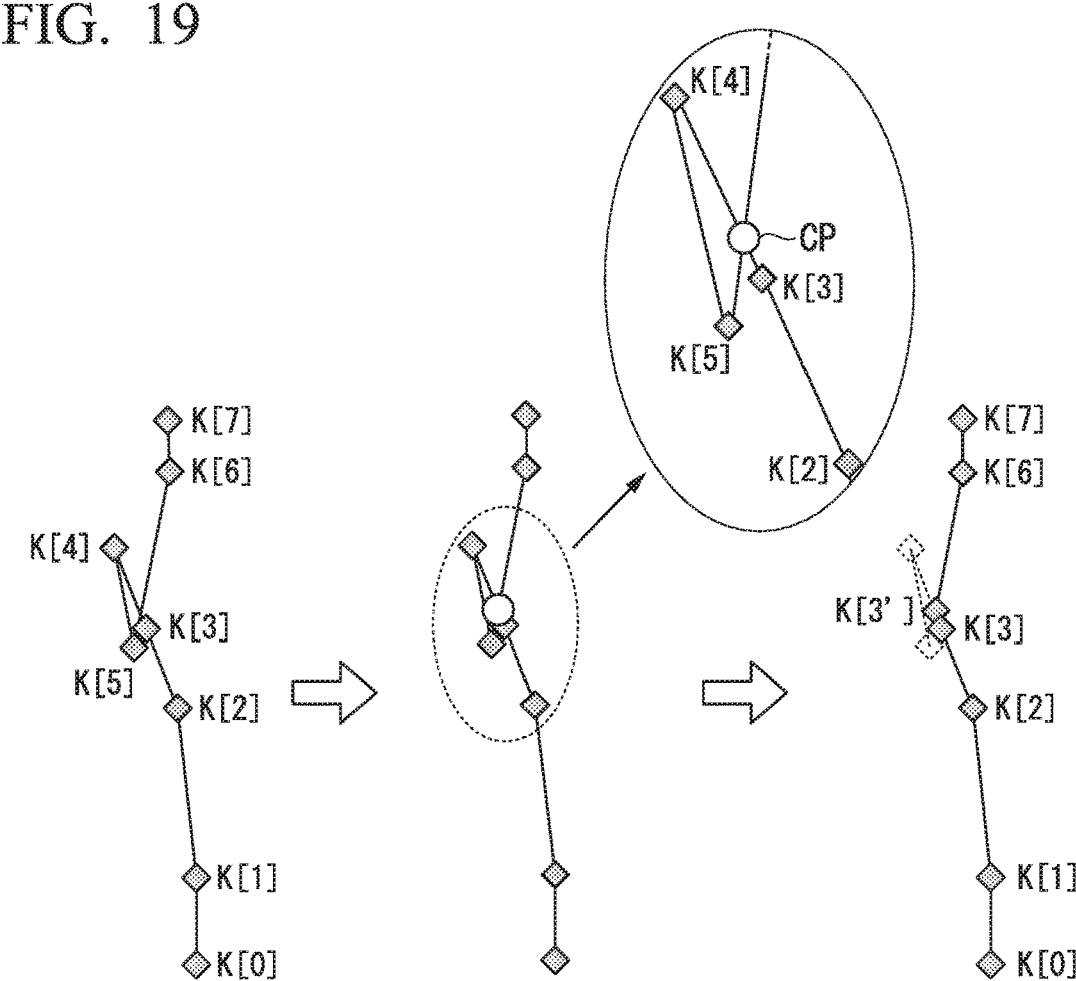
FIG. 19 is a diagram illustrating a correction process when a loop-shaped portion is formed in part of a traveling path.

FIG. 19 is a diagram illustrating a correction process when a loop-shaped portion is formed in part of the traveling path Tg #. In the drawing, points K[0] to K[7] represent points of a sequence of points of a spline curve indicating the traveling path Tg # after the inverse conversion using the inverse conversion unit 116. In the example illustrated in the drawing. In a section from the point K[3] to the point K[6], a link between K[3] and K[4] and a link between K[5] and K[6] intersect each other to form a loop-shaped portion. In this case, the inverse conversion unit 116 corrects the traveling path Tg # such that the sequence of points is formed in the order of K[3], K[3'], and K[6] by setting a predetermined path point K[3'] at an intersection CP of the links and deleting the points K[4] and K[5].

When a loop-shaped portion is formed in part of the traveling path Tg #, the inverse conversion unit 116 may correct the spline curve indicating the traveling path Tg # to a non-looped curve by approximating the spline curve to a function such as a polynomial.

Figure 20:
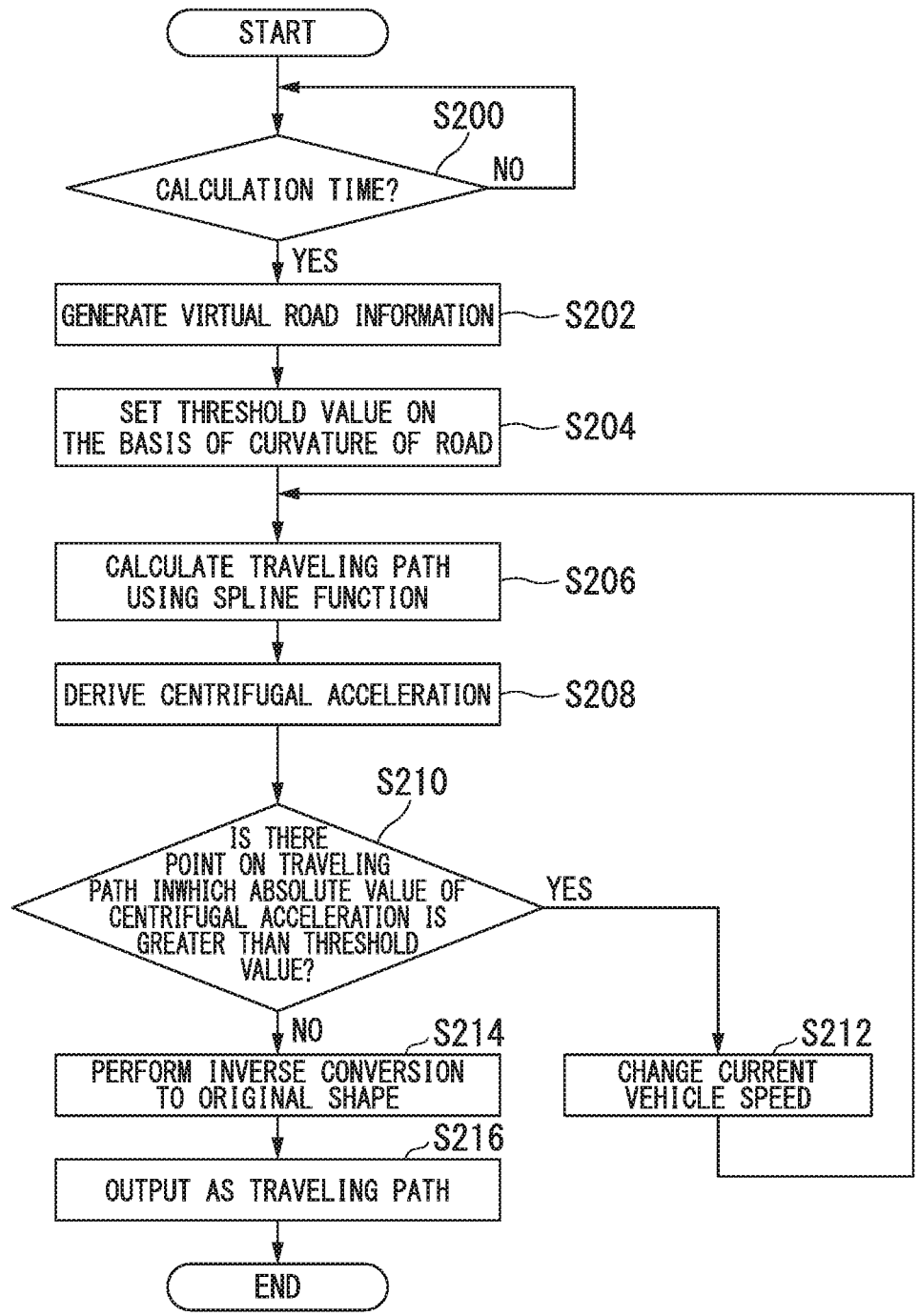
FIG. 20 is a flowchart illustrating an example of a process flow which is performed by the route generating unit according to the second embodiment.

FIG. 20 is a flowchart illustrating an example of a process flow which is performed by the route generating unit 110A according to the second embodiment. The process flow in the flowchart is performed before automatic driving is performed, that is, before control based on an action plan is performed. It is assumed that the process flow in the flowchart is performed, for example, in a scene in which a road is a curved road which is curved to left with respect to the traveling direction of the vehicle as illustrated in FIG. 15.

First, the route generating unit 110A determines whether a start time of a predetermined arithmetic operation period T has arrived (Step S200). The route generating unit 110A waits when it is determined that the start time of the predetermined arithmetic operation period T has not arrived and moves the process flow to Step S202 when it is determined that the start time of the predetermined arithmetic operation period T has arrived.

Then, the conversion unit 112 generates virtual road information 138 in which a shape of a road in which the host vehicle M travels has been virtually converted into a rectilinear shape on the basis of the map information 132 output from the map information acquiring unit 111 (Step S202).

Then, the path evaluating unit 117 sets the threshold value G1# for the centrifugal acceleration G on the basis of the curvature of the road which has not been converted by the conversion unit 112 (Step S204). Then, the traveling path generating unit 115 sets a current position of the host vehicle as a start point Ps, sets a target point output from the target point setting unit 113 as an end point Pe, and generates the traveling paths Tg by performing an arithmetic operation based on a spline function (Step S206).

Then, the path evaluating unit 117 derives the centrifugal accelerations G which is generated when the host vehicle M travels along the traveling paths Tg with the speed of the host vehicle M kept constant regardless of the time for each traveling path Tg generated by the traveling path generating unit 115 (Step S208). Then, the path evaluating unit 117 determines whether there is a point on each traveling path Tg at which the absolute value of the centrifugal acceleration G is greater than the threshold value G1# for all the traveling paths Tg (Step S210).

When there is a point on each traveling path Tg at which the absolute value of the centrifugal acceleration G is greater than the threshold value G1# for all the traveling paths Tg, the path evaluating unit 117 changes the speed of the host vehicle M which has been assumed at the time of deriving the centrifugal acceleration G to a lower speed than the speed of the host vehicle M which has been used in the process of Step S208 (Step S212) and returns the process flow to the process of Step S206.

When at least one traveling path Tg in which there is no point on each traveling path Tg at which the absolute value of the centrifugal acceleration G is greater than the threshold value G1# is present, the inverse conversion unit 116 generates the traveling path Tg # of the host vehicle M in the shape of the road which has not been converted into a rectilinear shape by the conversion unit 112 by performing inverse conversion of the conversion performed by the conversion unit 112 on the present traveling path Tg (Step S214).

Then, the inverse conversion unit 116 outputs the generated traveling path Tg # to the traveling control unit 120 (Step S216). Accordingly, the process flow in the flowchart ends.

Similarly to the first embodiment, the vehicle controller 100A according to the second embodiment can generate a traveling path suitable for a shape of a road with a low arithmetic operation load.

In the vehicle controller 100A according to the second embodiment, since only the traveling path Tg having a small centrifugal acceleration G is inversely converted by evaluating the centrifugal acceleration G for all the traveling paths Tg, it is possible to generate a traveling path Tg # that can reduce a burden on an occupant of the host vehicle M in a road such as a curved road.

Third Embodiment

A third embodiment will be described below. A vehicle controller 100B according to the third embodiment is different from those of the first and second embodiments, in that when an obstacle OB is present on a road in generating a traveling path Tg #, a size of the obstacle OB in which the shape has been virtually converted is considered. This difference will be mainly described below.

When an obstacle OB in a traveling lane is recognized by the outside recognizing unit 103, the conversion unit 112 according to the third embodiment converts a shape of the obstacle OB on a road at the same time as converting the shape of the road into a rectilinear shape. For example, since the shape of the obstacle OB is a circular shape as illustrated in FIG. 15, the shape of the obstacle is converted into a shape in which a part close to a reference point P is enlarged in the X direction which is the traveling direction of the vehicle and a part distant from the reference point P is reduced in the X direction with conversion of the shape of the road into a rectilinear shape. When this conversion into such a shape is performed, a traveling path Tg approaching the obstacle OB is likely to be generated in the vicinity of the reduced shape of the obstacle OB and a spline curve which should not be generated as the traveling path Tg due to interference with the obstacle OB with an original shape may be generated by the traveling path generating unit 115.

The path evaluating unit 117 according to the third embodiment corrects the shape of the obstacle OB # which has been converted into a rectilinear shape on the basis of the curvature of the road which has not been converted into a rectilinear in the virtual road which has been converted into a rectilinear shape in order to exclude a spline curve which should not be generated as the traveling path Tg from a choice before being inversely converted. For example, the path evaluating unit 117 corrects the shape of the obstacle OB # which has been converted to a rectangular shape circumscribing an ellipse indicating the shape of the obstacle OB # which has been converted. Then, the path evaluating unit 117 handles an area indicated by the derived rectangular shape as a virtual obstacle VOB and selects only the traveling path Tg not interfering with the obstacle VOB among a plurality of traveling paths Tg generated by the traveling path generating unit 115.

Figure 21:
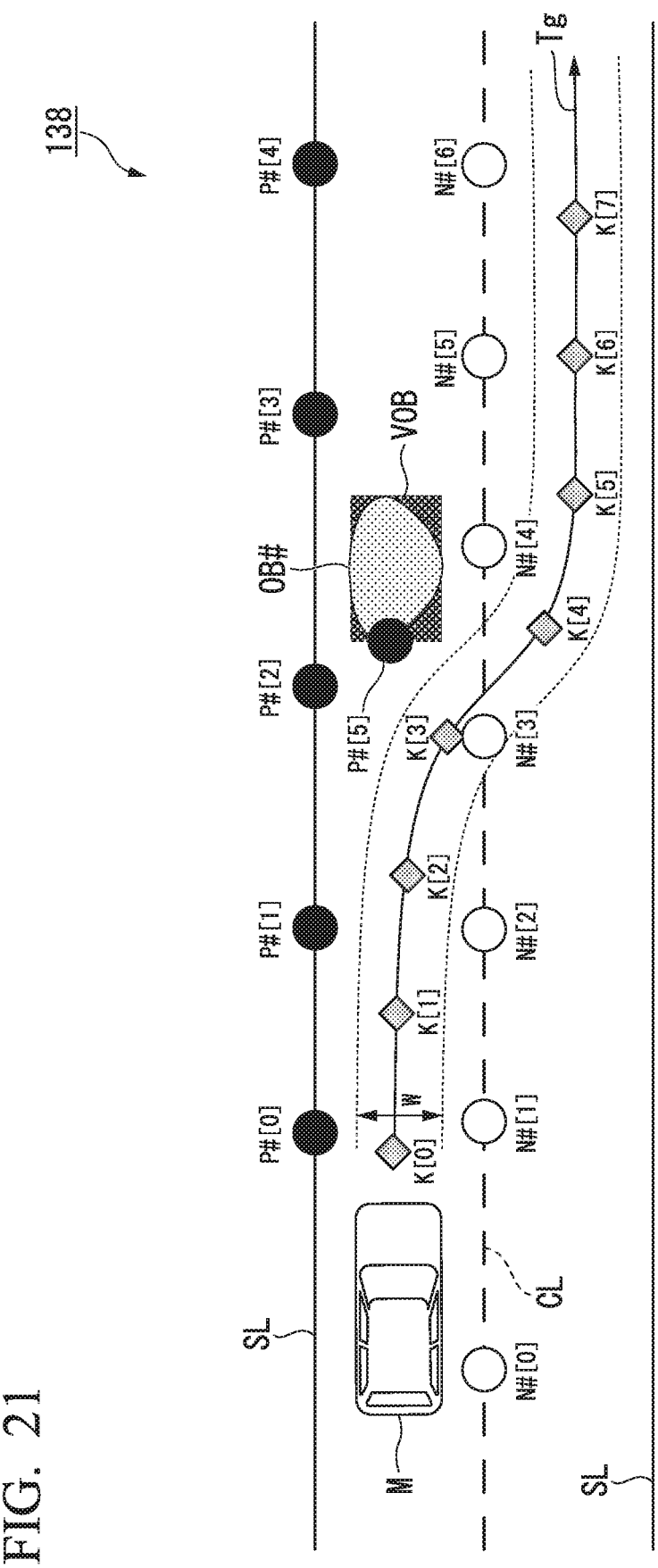
FIG. 21 is a diagram illustrating an example of a scene in which a virtual obstacle is set.

FIG. 21 is a diagram illustrating an example of a scene in which a virtual obstacle VOB is set. In the drawing, points K[0] to K[7] represent points of a sequence of points indicated by a spline curve. Hereinafter, these points are referred to as path points. As illustrated in the drawing, for example, the path evaluating unit 117 derives a distance from the path point K to the obstacle VOB for each path point K, and selects a traveling path Tg in which the distance is equal to or greater than a threshold value. This threshold value is set, for example, on the basis of a vehicle width W of the host vehicle M and a distance for margin between the host vehicle M and the obstacle OB. When the distance from the path point K to the obstacle VOB is equal to or less than the threshold value, the traveling path Tg is considered to interfere with the obstacle VOB. The inverse conversion unit 116 generates the traveling path Tg # of the host vehicle M by performing inverse conversion of the conversion performed by the conversion unit 112 on only the traveling path Tg selected by the path evaluating unit 117, that is, the traveling path Tg not interfering with the obstacle VOB.

The path evaluating unit 117 may correct the shape of the obstacle OB # which has been converted into a rectilinear shape on the basis of the distance from a line marking converted into a rectilinear shape to the obstacle OB in a virtual road which has been converted into a rectilinear shape in order to exclude a spline curve which should not be generated as the traveling path Tg from a choice before the inverse conversion. In the above-mentioned embodiments, the line marking which should be converted into a rectilinear shape is the road centerline CL on the basis of the positional relationship with the reference point P, but the invention is not limited thereto and may be an arbitrary line as long as the line extends in the traveling direction of the vehicle. For example, a line marking which should be converted into a rectilinear shape is a line which passes through a reference point (for example, the center of gravity) of the host vehicle M and which is parallel to the road centerline CL or the road side line SL.

Figure 22:
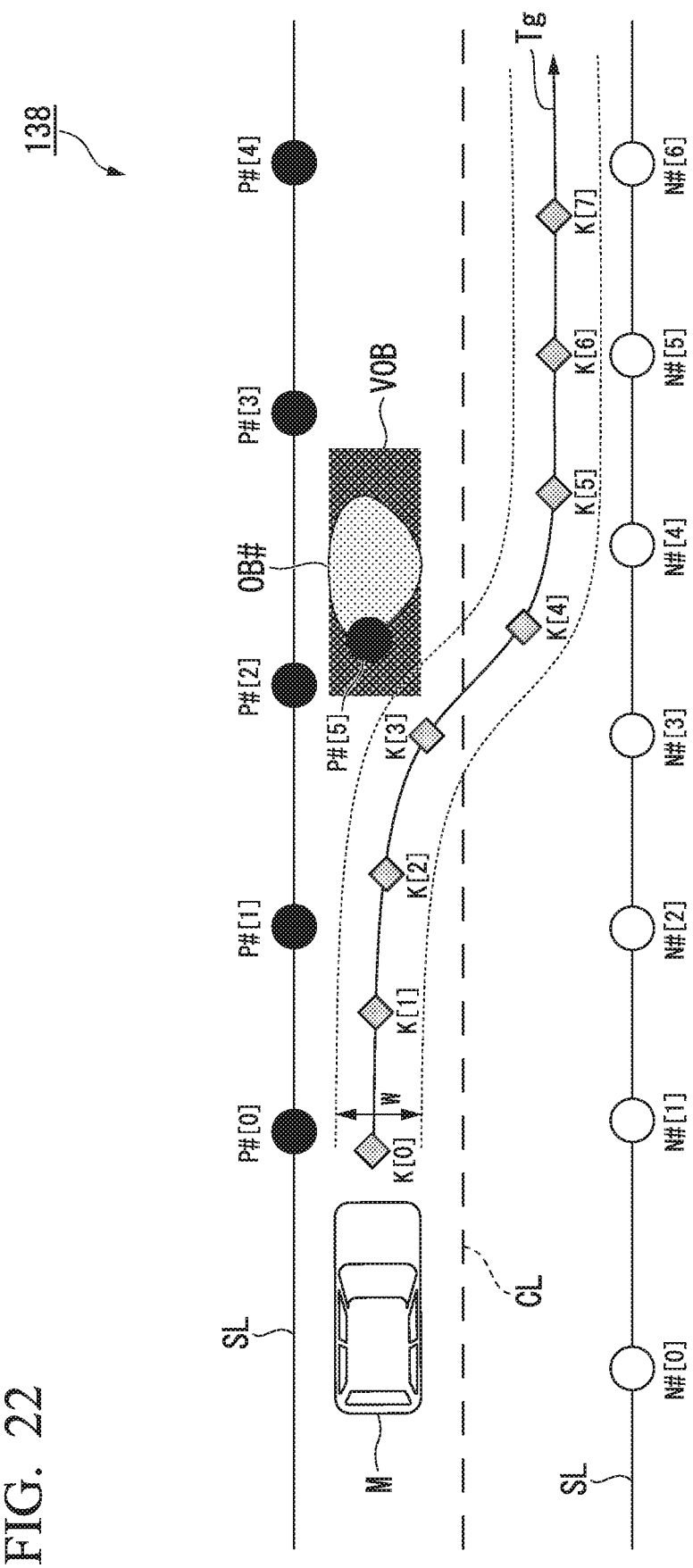
FIG. 22 is a diagram illustrating another example of the scene in which a virtual obstacle is set.

FIG. 22 is a diagram illustrating another example of the scene in which a virtual obstacle VOB is set. In the example illustrated in FIG. 22, the reference points P are set on a right road side line SL in the traveling direction of a vehicle. In the example illustrated in the drawing, a line marking which should be converted into a rectilinear shape is set to a right road side line SL in the traveling direction of a vehicle. In this case, the shape of the obstacle OB which is converted by the conversion unit 112 is enlarged and reduced at a larger magnification because distances to the reference points P are larger than those when the line marking which should be converted into a rectilinear shape is set to the left road side line SL as illustrated in FIG. 21. In this case, in comparison with FIG. 21, more traveling paths Tg which interfere with the obstacle OB with an original shape are likely to be generated. Accordingly, the path evaluating unit 117 corrects the shape of the obstacle OB # which has been converted to a larger shape at least in the traveling direction of the vehicle as the distance from the line marking which should be converted into a rectilinear shape to the obstacle OB becomes larger. In the example illustrated in FIG. 22, since the distance from the road side line SL which has been converted into a rectilinear shape to the obstacle OB is larger than that in the example illustrated FIG. 21, the path evaluating unit 117 sets the size of the obstacle VOB to be double the size of the obstacle VOB illustrated in FIG. 21. Accordingly, the path evaluating unit 117 can exclude the traveling path Tg which is likely to interfere with the obstacle OB when the shape of the road is returned to the original shape before conversion is performed by the inverse conversion unit 116. The path evaluating unit 117 may correct the shape of the obstacle OB # which has been converted in the width direction of the vehicle on the basis of the distance from the line marking which should be converted into a rectilinear shape to the obstacle OB. For example, the path evaluating unit 117 corrects the shape of the obstacle OB # to a larger shape in the width direction of the vehicle as the distance from the line marking to the obstacle OB becomes larger.

The vehicle controller 100B according to the third embodiment can generate a traveling path suitable for a shape of a road with a low arithmetic operation load, similarly to the first and second embodiments.

The vehicle controller 100B according to the third embodiment can generate a traveling path Tg # suitable for avoiding an obstacle OB by converting a shape of a road along with a shape of the obstacle OB into a rectilinear shape and correcting the shape of the obstacle OB # which has been converted on the basis of one or both of the curvature of the road which has not been converted and the distance from the reference point P to the obstacle OB.

While embodiments of the invention have been described above, the invention is not limited to the embodiments and can be subjected various modifications and substitutions without departing from the gist of the invention.

REFERENCE SIGNS LIST

10 Navigation device
20 Vehicle sensor

30 Operation device
32 Operation detection sensor
40 Switch
50 Travel driving force output device
52 Steering device
52a Steering angle sensor
54 Brake device
100 Vehicle controller
102 Vehicle position recognizing unit
104 Action plan generating unit
110 Route generating unit
111 Map information acquiring unit
112 Conversion unit
113 Target point setting unit
114 Vehicle state acquiring unit
115 Traveling path generating unit
116 Inverse conversion unit
117 Path evaluating unit
120 Traveling control unit
122 Control switching unit
130 Storage unit

What is claimed is:

1. A route generator comprising:
a conversion unit configured to generate virtual road information in which a shape of a road has been converted into a rectilinear shape on the basis of map information including information indicating the shape of the road;
a traveling path generating unit configured to generate a traveling path of a host vehicle on the road having the rectilinear shape in the virtual road information generated by the conversion unit; and
an inverse conversion unit configured to generate a traveling path of the host vehicle in the shape of the road which has not been converted into the rectilinear shape by the conversion unit by performing inverse conversion of the conversion performed by the conversion unit on the traveling path of the host vehicle generated on the road having the rectilinear shape by the traveling path generating unit.

2. The route generator according to claim 1, wherein the inverse conversion unit performs the inverse conversion such that a distance between a divided line closest to a reference point set on the basis of the map information among divided lines into which a rectilinear line representing a road included in the virtual road information is divided and the reference point is maintained before and after the inverse conversion.

3. The route generator according to claim 1, wherein the traveling path generating unit generates the traveling path by performing geometric curve interpolation on the road having the rectilinear shape in the virtual road information generated by the conversion unit.

4. The route generator according to claim 3, wherein the traveling path generating unit generates the traveling path by applying a spline curve based on at least a velocity vector of the host vehicle.

5. The route generator according to claim 1, further comprising a recognition unit configured to recognize an obstacle which hinders traveling of the host vehicle on the road,
wherein the traveling path generating unit generates a plurality of obstacle-avoiding traveling paths for avoiding the obstacle recognized by the recognition unit.

6. The route generator according to claim 5, further comprising a path evaluating unit configured to select one obstacle-avoiding traveling path in which the host vehicle does not interfere with the obstacle on the basis of a curvature of the shape of the road which has not been converted by the conversion unit and curvatures of the plurality of obstacle-avoiding traveling paths among the plurality of obstacle-avoiding traveling paths generated on the road having the rectilinear shape by the traveling path generating unit when the obstacle has been recognized by the recognition unit,
wherein the inverse conversion unit generates the obstacle-avoiding traveling path of the host vehicle in the shape of the road which has not been converted into the rectilinear shape by the conversion unit by performing inverse conversion of the conversion performed by the conversion unit on the one obstacle-avoiding traveling path selected by the path evaluating unit.

7. The route generator according to claim 6, wherein the path evaluating unit sets an area based on the shape of the obstacle on the basis of a distance from the divided line from which a distance to the reference point is to be maintained to the obstacle recognized by the recognition unit, and selects one obstacle-avoiding traveling path in which the host vehicle does not interfere with the set area among the plurality of obstacle-avoiding traveling paths generated on the road having the rectilinear shape by the traveling path generating unit when the obstacle has been recognized by the recognition unit.

8. The route generator according to claim 1, wherein the inverse conversion unit corrects the traveling path forming a loop-shaped portion to a path other than the loop-shaped portion when the generated traveling path forms the loop-shaped portion by intersecting itself.

9. A route generation method comprising:
generating virtual road information in which a shape of a road has been converted into a rectilinear shape on the basis of map information including information indicating the shape of the road;
generating a traveling path of a host vehicle on the road having the rectilinear shape in the generated virtual road information; and
generating a traveling path of the host vehicle in the shape of the road which has not been converted into the rectilinear shape by performing inverse conversion of the conversion of converting the shape of the road to the rectilinear shape on the traveling path of the host vehicle generated on the road having the rectilinear shape.

10. Non-transitory computer-readable media storing a route generation program for execution by an on-board computer to perform:
generating virtual road information in which a shape of a road has been converted into a rectilinear shape on the basis of map information including information indicating the shape of the road;
generating a traveling path of a host vehicle on the road having the rectilinear shape in the generated virtual road information; and
generating a traveling path of the host vehicle in the shape of the road which has not been converted into the rectilinear shape by performing inverse conversion of the conversion of converting the shape of the road to the rectilinear shape on the traveling path of the host vehicle generated on the road having the rectilinear shape.

* * * * *